US012677986B2

(12) United States Patent
Liu et al.

(10) Patent No.: US 12,677,986 B2
(45) Date of Patent: Jul. 14, 2026

(54) LOCK STRUCTURE AND COOKING APPLIANCE

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Hongyu Liu, Foshan (CN); Xin Zhang, Foshan (CN); Tian Tang, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 1079 days.

(21) Appl. No.: 17/829,828

(22) Filed: Jun. 1, 2022

(65) Prior Publication Data

US 2023/0148789 A1    May 18, 2023

Related U.S. Application Data

(63) Continuation of application No. PCT/CN2021/139769, filed on Dec. 20, 2021.

(30) Foreign Application Priority Data

Nov. 17, 2021    (CN) .......................... 202111362833.9
Nov. 17, 2021    (CN) .......................... 202111362839.6
(Continued)

(51) Int. Cl.
    *A47J 36/00*        (2006.01)
    *F24C 15/02*        (2006.01)
(52) U.S. Cl.
    CPC ............. *A47J 36/00* (2013.01); *F24C 15/022* (2013.01)

(58) Field of Classification Search
    CPC ........ F24C 15/022; F24C 15/32; F24C 15/00; F24C 15/02; F24C 15/021; F24C 15/2035;
    (Continued)

(56) References Cited

U.S. PATENT DOCUMENTS

2007/0039606 A1    2/2007 Larsen et al.
2014/0079844 A1    3/2014 Zhang et al.
(Continued)

FOREIGN PATENT DOCUMENTS

CN        101397867 A      4/2009
CN        102817511 A      12/2012
(Continued)

OTHER PUBLICATIONS

Noh, KR 20100101238 A Sep. 2010.*
(Continued)

*Primary Examiner* — Vy T Nguyen
(74) *Attorney, Agent, or Firm* — Scully, Scott, Murphy & Presser, P.C.

(57) ABSTRACT

A lock structure and a cooking appliance are provided. The lock structure has a fixing member and a locking assembly. The locking assembly has a bearing member, a mount connected to the bearing member, a driving member, a first elastic member and a locking member. The bearing member is detachably connected to a surface. At least a portion of the driving member is provided within the mount. A first end of the first elastic member is connected to the driving member. The locking member is connected to a second end of the first elastic member. The locking member is capable of moving relative to the mount under the driving of the driving member and the first elastic member, and is locked to or separated from the fixing member.

17 Claims, 16 Drawing Sheets

(30)  Foreign Application Priority Data

Nov. 17, 2021   (CN) .......................... 202122817846.2
Nov. 17, 2021   (CN) .......................... 202122817849.6

(58) Field of Classification Search
CPC .......... F24C 7/02; A47J 36/00; A47J 37/0623;
E05B 2047/0024; E05B 47/0012; E05B
65/0014; E05C 1/02; E05C 1/10; E05C
19/02; E05C 19/06; E05C 3/004; E05C
3/16; H05B 2206/04; H05B 6/6414;
H05B 6/6417; H05B 6/76
USPC ........................................................ 219/723
See application file for complete search history.

(56)  References Cited

U.S. PATENT DOCUMENTS

| | | | |
|---|---|---|---|
| 2015/0359046 A1 | 12/2015 | Mohseni | |
| 2016/0334111 A1 | 11/2016 | Kim | |

FOREIGN PATENT DOCUMENTS

| | | | |
|---|---|---|---|
| CN | 107503591 A | 12/2017 | |
| CN | 207420280 U | 5/2018 | |
| CN | 111236774 A | 6/2020 | |
| CN | 212037161 U | 12/2020 | |
| CN | 212054229 U | 12/2020 | |
| CN | 112447431 A | 3/2021 | |
| CN | 212716219 U | 3/2021 | |
| CN | 112696107 A | 4/2021 | |
| CN | 212912769 U | 4/2021 | |
| CN | 212958380 U | 4/2021 | |
| CN | 212961752 U | 4/2021 | |
| CN | 113261794 A | 8/2021 | |
| CN | 214246964 U | 9/2021 | |
| CN | 214510843 U | 10/2021 | |
| CN | 214588558 U | 11/2021 | |
| CN | 214631608 U | 11/2021 | |
| CN | 216476796 U | 5/2022 | |
| CN | 216841067 U | 6/2022 | |
| JP | 2021173434 A | 11/2021 | |

OTHER PUBLICATIONS

Ye, WO 2018133455 A1 Jul. 2018.*
Notice of First Office Action dated Apr. 8, 2022 received in Chinese Patent Application No. CN 202122817846.2.
Notice of Second Office Action dated May 19, 2022 received in Chinese Patent Application No. CN 202122817846.2.
International Search Report and Written Opinion dated Jul. 27, 2022 received in International Application No. PCT/CN2021/139769.
First Office Action dated Jun. 28, 2025 received in Chinese Patent Application No. 202111362833.9.
First Office Action dated Jun. 28, 2025 received in Chinese Patent Application No. 202111362839.6.

* cited by examiner

108

106

108

106

108

106

LOCK STRUCTURE AND COOKING APPLIANCE

CROSS-REFERENCE TO RELATED APPLICATIONS

This application is a continuation application of PCT International Patent Application No. PCT/CN2021/139769, filed on Dec. 20, 2021, which claims priority to and benefits of Chinese Patent Application No. 202122817849.6 filed with China National Intellectual Property Administration on Nov. 17, 2021, Chinese Patent Application No. 202111362839.6 filed with China National Intellectual Property Administration on Nov. 17, 2021, Chinese Patent Application No. 202122817846.2 filed with China National Intellectual Property Administration on Nov. 17, 2021, and Chinese Patent Application No. 202111362833.9 filed with China National Intellectual Property Administration on Nov. 17, 2021, the entire contents of which are herein incorporated by reference for all purposes. No new matter has been introduced.

FIELD

The present disclosure relates to the technical field of kitchen appliance, and in particular, to a lock structure and a cooking appliance.

BACKGROUND

After cooking is done, a user can directly open a door body assembly of a cooking appliance, and the food just cooked at this time tends to be at a higher temperature, with the possibility of scalding the user. Especially after the children cook food with the cooking appliance, accidents are more likely to occur.

In the related art, a key-type lock structure is used to restrain the opening and closing of the door body assembly; however, when the door body assembly is opened, there is a case where the user falsely triggers a key-type structure, and at this time, the user cannot close the key-type lock structure, resulting in the impossibility of the user to close the door body assembly.

SUMMARY

The present disclosure is intended to solve at least one of the technical problems existing in the prior art or the related art.

A first aspect of the present disclosure provides a lock structure.

A second aspect of the present disclosure provides a cooking appliance.

A third aspect of the present disclosure provides a lock structure.

A fourth aspect of the present disclosure provides a cooking appliance.

In the first aspect, the present disclosure provides a lock structure comprising: a fixing member; and a locking assembly. The locking assembly comprises: a bearing member capable of being detachably connected with a mounting surface; a mount connected to the bearing member; a driving member, at least a portion of the driving member being provided within the mount; a first elastic member, a first end of the first elastic member being linked to the driving member; and a locking member connected to a second end of the first elastic member, the locking member is capable of moving relative to the mount under the driving of the driving member and the first elastic member, and being locked to or separated from the fixing member.

The lock structure as provided herein comprises a fixing member and a locking assembly. The locking assembly and the fixing member can cooperate to play the role of locking to restrain. For example, the lock structure provided in the present disclosure is applicable to the cooking appliance and is used as a child lock for the cooking appliance.

The locking assembly comprises a mount, a driving member, a first elastic member, and a locking member. The mount is mounted to an external object (such as a door body assembly or a cavity body assembly of the cooking appliance); at least a portion of the driving member is provided within the mount, and a first end of the first elastic member is connected to the driving member; a second end of the first elastic member is linked to the locking member. Thus, the driving member may be applied to the locking member via the first elastic member with a pushing force such that the locking member moves relative to the mount driven by the driving member and the first elastic member, thereby causing the locking member to lock with the fixing member through the mount.

In the lock structure provided by the present disclosure, the first elastic member abuts the driving member and the locking member, thereby achieving a flexible connection between the locking member and the driving member. Thus, in the case where the locking assembly is at the locked position, the locking member can still move towards a side of the driving member due to the presence of the first elastic member.

For example, the fixing member and the locking assembly can be mounted to the cavity body assembly and the door body assembly, respectively, so that, once the user inadvertently closes the locking assembly with the door body assembly opened, the fixing member contacts the locking member when the user closes the door body assembly without switching the locking member station, thereby forcing the locking member to move toward a side of the driving member. In this way, on the one hand, the connection for restraining between the locking member and the fixing member can be ensured, and on the other hand, the connection for restraining between the locking member and the fixing member does not require user operation, which greatly improves the convenience of using the locking assembly.

When the door body assembly is in a closed state, the locking member is in a locking station; at this time, the locking member is connected to the fixing member for restraining and the user could not open the door body assembly. Before the door body assembly is opened, the connection for restraining between the locking member and the fixing member is released; at this time, the locking member is in an unlocking position, and the locking member is separated from the fixing member.

In the process of opening the door body assembly, the door body assembly can be directly driven to separate from the cavity body assembly to complete the door opening operation; at this time, the locking member is still in the unlocking station. In the process of closing the door body assembly, the work position of the locking member can be switched again after the door body assembly is directly closed, so that the locking member is connected to the fixing member for restraining. Furthermore, as soon as the user switches the locking member to the locking position when the door body assembly is opened, the first elastic member abuts the locking member and the driving member, so that the locking member and the driving member are elastically connected. In this way, the user does not need to switch the station of the locking member in advance to ensure that the locking member can still lock with the fixing member during the close of the door body assembly.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly and the fixing member, if the user wants to open the door body assembly, it is necessary to pull the locking member while opening the door body assembly. Thus, on the one hand, the user can be prompted, and on the other hand, the children can be prevented from mistakenly opening the door body assembly, which greatly improves the safety of the cooking appliance.

Therefore, the lock structure provided in the present disclosure cooperates with the fixing member via the locking assembly to enhance the unlocking difficulty of the lock structure, avoid the user, especially children, from opening the door body assembly by mistake, and improve the use security of the cooking appliance to which the lock structure is applied. Furthermore, the flexible connection between the driving member and the locking member can close the door body assembly without driving the locking member and ensure that the connection between the locking member and the fixing member is restrained even if the user mistakenly switches the locking member to the locking position when the door body assembly is opened.

The bearing member supports the mount, and the mount is mounted on the bearing member. The lock structure can be mounted to the cooking appliance. For example, the bearing member can be detachably connected to the mounting surface of the cooking appliance, i.e., the bearing member can be detached from the cooking appliance. When the lock structure is damaged, it is possible to disassemble the lock structure from the mounting surface, so as to avoid the case where the cooking appliance cannot be switched on or off due to the lock structure damage, and improve the user convenience to the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible design, the bearing member comprises a mounting portion provided with a first opening and a first side surface, and the first side surface is used for detachably connecting with the mounting surface; a bearing portion, wherein a first end of the bearing portion is connected with the first side surface, the bearing portion is provided with a second opening and an accommodating portion in communication, the second opening is located at the second end of the bearing portion, the mount extends into the accommodating portion via the first opening, and the locking member can move relative to the second opening and is locked to or separated from the fixing member.

In this design, the locking member moves relative to the second opening and locks or disengages from the fixing member, the locking member locks with the fixing member when the locking member extends outward from the second opening, and the locking member disengages from the fixing member when the locking member extends inward from the second opening. The first end of the bearing portion is connected to the mounting portion, and the second end of the bearing portion is provided with a second opening, so that a user needs to press the locking member via the first opening. Furthermore, since the first side surface of the mounting portion can be connected to a mounting surface, the mounting portion is mounted on an outside surface of the cooking appliance. The mounting portion is detachably connected to the outside surface of the cooking appliance, and the mounting portion can be detached from the outside surface of the cooking appliance on the outside of the cooking appliance when the lock structure is damaged so as not to open the door body of the cooking appliance. The removal of the lock structure from the outside of the cooking appliance enables the door body of the cooking appliance to be opened by removing the lock structure even if the lock structure is damaged, further improving the user convenience in using the lock structure.

In one possible design, the mounting portion extends beyond a circumferential edge of the bearing portion, and the mounting portion extending beyond the circumferential edge of the bearing portion is configured to abut against the mounting surface.

In this design, an end portion facing the bearing portion in the mounting portion is a first side surface, the end portion facing the mounting portion in the bearing portion is a second side surface, and the area of the first side surface is greater than the area of the second side surface, so that the mounting portion can extend beyond the circumferential edge of the bearing portion. Since the first side surface of the mounting portion is used in conjunction with the mounting surface, the portion of the mounting portion that protrudes from the circumferential edge of the bearing portion can contact the mounting surface, the mounting portion and the mounting surface have a larger contact area, improving connection stability of the lock structure and outside surface of the cooking appliance.

In one possible design, the mount is detachably connected to the bearing portion.

In this design, when one of the mounts and the bearing member is damaged, the mount can be disassembled from the bearing member so that one of the mounts and the bearing member can be serviced or replaced, further reducing the maintenance cost of the lock structure.

In one possible design, the bearing member further comprises a baffle connected to the bearing portion, and the baffle can slide inside the accommodating portion to push the locking member.

In this design, the baffle can slide in the accommodating portion, and the user can press the baffle, so that the baffle pushes the locking member; the surface to be pushed of the baffle has a larger area, and the contact area of the baffle with the user's hands is larger, which can improve the driving convenience of the user for the locking member. In addition, the baffle can shield the first opening from impurities entering the accommodating portion, and the interior of the lock structure is less likely to get stuck due to impurities, which is beneficial to improving the functional stability of the lock structure.

In one possible design, the locking assembly further comprises a guide structure provided on the mount, at least a portion of the driving member being movable along with the guide structure and restrained at an end of the guide structure.

In this design, the locking assembly further comprises a guide structure. The guide structure is provided inside the mount, and at least a portion of the driving member is slidably connected to the guide structure and is capable of restraining the end portion of the guide structure such that the locking member stays at the locking station.

For example, the end portion of the guide structure is provided with a restraining portion, and at least a part of the driving member can move along the guide structure; when at least a portion of the driving member moves to the end portion of the guide structure, at least a portion of the driving member abuts against the restraining portion of the guide structure end portion, thereby restraining the locking member to the locked position.

For example, the guide structure comprises a guide rib, and the extending direction of the guide rib coincides with the moving direction of the locking member; at least a portion of the driving member can move along the guide rib and at least a portion of the driving member can abut against the end portion of the guide rib, thereby restraining the locking member to the locked position.

In one possible design, the driving member comprises a pressing member penetrating through the mount and being movably connected to the mount, wherein the pressing member comprises a first inclined surface; a moving member in sliding connection with the guide structure, the moving member connects with a first end of the first elastic member, the moving member can be restrained to an end portion of the guide structure; wherein the moving member comprises a second inclined surface, and the first inclined surface can abut against the second inclined surface so as to drive the moving member to drive the locking member to switch the station.

In this design, the driving member comprises a pressing member and a moving member. The pressing member is movably connected to the mount and penetrates through the mount, and at least a portion of the pressing member is located throughout the outside surface of the cooking appliance; during the use of the cooking appliance, the station of the locking member can be switched by pressing the pressing member. The moving member is placed inside the mount and is slidingly connected to the guide structure. In addition, the moving member is connected to the first end of the first elastic member such that the first elastic member is located between the moving member and the locking member. Therefore, during the use of the cooking appliance, the user can press the pressing member, and the pressing member drives the moving member to operate, and the moving member drives the locking member to switch the station via the first elastic member.

For example, the pressing member comprises a first inclined surface and the moving member comprises a second inclined surface. When the user presses the pressing member, the first inclined surface of the pressing member comes in contact with the second inclined surface of the moving member. When the pressing member is pressed for the first time, the moving member will move along the guide structure; when the moving member moves to an end portion of the guide structure, the second inclined surface cooperates with the first inclined surface to drive the moving member to rotate, and the moving member can abut against the restraining portion, and the locking member can be restrained to the locked position. When the pressing member is pressed for a second time, the second inclined surface, in cooperation with the first inclined surface, again drives the moving member to rotate, at which time the moving member moves in an opposite direction along with the guide structure, thereby separating the moving member from the restraining portion, and the locking member is switched from the locked position to the unlocked position.

In some possible designs, the pressing member comprises a key column, a sidewall of the key column is provided with a third protruding portion, and the third protruding portion is used for restraining the key column.

In this design, the pressing member comprises a key column. The sidewall of the key column is provided with a third protruding portion, and the third protruding portion can abut against an end portion of the mount, thereby ensuring that at least a part of the mounting column is always inside the mount, thereby ensuring that the key column is connected to the mount.

During use, the first elastic member abuts the locking member and the moving member. In this way, by restraining the abutment of the third protruding portion against the mount, it is ensured that the key column does not disengage from the mount under the elastic force action of the first elastic member.

In one possible design, the moving member comprises a sliding jaw sleeve, a sidewall of the sliding jaw sleeve is provided with a first protruding portion which is slidably connected to the guide structure and can abut against the end portion of the guide structure, and the second inclined surface is provided at the first protruding portion.

In this design, the moving member comprises a sliding jaw sleeve. The sidewall of the sliding jaw sleeve is provided with a first protruding portion which is slidably connected to the guide structure, and the first protruding portion can abut against the end portion of the guide structure, thereby restraining the locking member to the locked position.

For example, the interior of the key column is hollow and at least a portion of the sliding jaw sleeve can extend into the interior of the key column. In addition, the first inclined surface is at an open end of the key column and a second inclined surface is provided at the first protruding portion. When the pressing member is pressed for the first time, the first protruding portion drives the moving member to move along the guide structure; when the moving member moves to an end portion of the guide structure, the second inclined surface cooperates with the first inclined surface to drive the moving member to rotate, and at this time, the first protruding portion can abut against the restraining portion, and the locking member can be restrained to the locked position. When the pressing member is pressed for the second time, the second inclined surface cooperates with the first inclined surface to drive the moving member to rotate again. At this time, the moving member moves in a reverse direction along the guide structure under the action of a first elastic member, so that the first protruding portion is separated from the restraining portion, and the locking member is switched from the locked position to the unlocked position.

In one possible design, the interior of the moving member is hollow, the sidewall of the moving member is provided with a guide groove, and the extending direction of the guide groove is consistent with the moving direction of the locking member; at least a portion of the locking member is located within the moving member, a sidewall of the locking member is provided with a second protruding portion, and the second protruding portion is slidably connected to the guide groove.

In this design, the interior of the moving member is hollow and at least a portion of the locking member is located inside the moving member. In addition, a sidewall of the moving member is provided with a guide groove, and an extending direction of the guide groove is consistent with the moving direction of the locking member; the second protruding portion is provided on the locking member, the second protruding portion is located in the guide groove, and the second protruding portion is slidably connected to the guide groove. In this way, during use, the locking member can move relative to the moving member under the action of the external force, thereby ensuring that even if the user inadvertently closes the locking assembly, the locking member can be retracted into the mount to ensure that the locking member and the fixing member can be connected for restraining.

For example, with the door body assembly opened, the first elastic member abuts the moving member and the locking member. At this time, the second protruding portion is in the middle of the guide groove or in the first end of the guide groove near the bottom of the mount to ensure that the locking member retracts inside the mount driven by the external force to ensure that the locking member can still lock with the fixing member even if the user inadvertently closes the locking assembly.

In addition, during the movement of the locking member, the second protruding portion moves along the guide groove, and thus plays a certain restraining and guiding role through the cooperation of the second protruding portion and the guide groove, so as to improve the running stability of the locking member.

In one possible design, the locking member further comprises a driving inclined surface abutting against a fixing member to drive the locking member to move relative to the mount.

In this design, the locking member further comprises a driving inclined surface. After the door body assembly is opened, if the user falsely triggers the locking assembly, the locking member is extended out of the mount. At this time, in the process of closing the door body assembly by the user, the closing of the door body assembly can be directly driven without pressing the pressing member again, which is more convenient for the user operation.

For example, in the process of closing the door body assembly by the user, the fixing member first comes into contact with the driving inclined surface of the locking member, and the driving inclined surface decomposes the force applied to the locking member by the fixing member into a transverse component force and a vertical component force, wherein the vertical component force can be used to counteract the pushing force applied to the locking member by the first elastic member, so that the locking member moves under the action of the above-mentioned vertical component force, so that the locking member returns to the inside of the mount. At this time, the user closes the door body assembly.

In one possible design, the locking assembly further comprises a second elastic member provided in the mount and is connected to the driving member and the mount for moving the locking member back; wherein at least a part of the first elastic member is located inside the locking member, and the second elastic member is sleeved on the locking member.

In this design, the locking assembly further comprises a second elastic member. The second elastic member is provided within the mount and abuts a moving member of the driving member and a cover plate of the mount. Thus, the stability of the locking member is further improved by the cooperation of the first elastic member and the second elastic member.

During the pressing of the pressing member, the pressing member extrudes the second elastic member before the pressing member contacts the moving member, when the second elastic member is in a compressed state; after the pressing member contacts the moving member, the pressing member extrudes both the first elastic member and the second elastic member while the first elastic member and the second elastic member are in compression.

For example, when the moving member is restrained to the end portion of the guide structure, both the first elastic member and the second elastic member in a compressed state apply a pushing force to the moving member, thereby enabling the moving member to be stably restrained to the end portion of the guide structure. After pressing the pressing member again, the moving member rotates and disengages from an end portion of the guide structure; at this time, the first elastic member and the second elastic member cooperate in compression to move back the moving member to the previous position. In this process, due to the cooperation of the above-mentioned first elastic member and second elastic member, the pushing force to the driving member can be greatly improved, thereby further improving the stability of the locking member.

In one possible design, the mount comprises a fixing bracket; a third opening provided in the fixing bracket, and the driving member penetrating through the third opening; a cover plate connected to the fixing bracket; a fourth opening provided in the cover plate, wherein the locking member can penetrate through a fourth opening.

In this design, the mount comprises a fixing bracket, a first opening, a cover plate, and a second opening. The fixing bracket can ensure the stable mounting of the whole locking assembly; the cover plate interfaces with the fixing bracket such that the cover plate mates with the fixing bracket to secure components such as a locking member and a first elastic member.

In addition, the fixing bracket is provided with a first opening, the cover plate is provided with a second opening, and the first opening is provided corresponding to the second opening. The pressing part of the locking member is provided through the first opening and is located on the surface of the cooking appliance; the locking member can be driven by the moving member and the first elastic member through the second opening and into a fixing opening of the fixing member to restrain the door body assembly.

In a second aspect, the present disclosure provides a cooking appliance, comprising: a cavity body assembly; a door body assembly in open-close connection with a cavity body assembly; the lock structure as in any possible design of the first aspect; wherein the fixing member is provided in one of the cavity body assembly and the door body assembly and the locking assembly is provided in the other of the cavity body assembly and the door body assembly.

The cooking appliance provided herein has the full benefit of the lock structure provided in any of the possible designs described above.

The cooking appliance provided in the present disclosure comprises a cavity body assembly, a door body assembly, and a lock structure in any of the possible designs of the first aspect described above. The cavity body assembly comprises a cooking cavity, and the cooking cavity is used for placing the food to be cooked; the door body assembly is connected to the cavity body assembly and is used to open or close the cooking cavity. For example, the door body assembly may be rotatably connected to the cavity body assembly or slidably connected to the cavity body assembly. One of the cavity body assembly and door body assembly is provided with the other locking assembly of the fixing member, the cavity body assembly, and the door body assembly, and the locking assembly cooperates with the fixing member to lock the door body assembly to the cavity body assembly. For example, the above-mentioned locking assembly is a child lock and functions as an auxiliary connection.

When the door body assembly is in a closed state, the locking member is in a locking station; at this time, the locking member is connected to the fixing member for restraining and the user could not open the door body assembly. Before the door body assembly is opened, the connection for restraining between the locking member and the fixing member is released; at this time, the locking member is in an unlocking position, and the locking member is separated from the fixing member.

In the process of opening the door body assembly, the door body assembly can be directly driven to separate from the cavity body assembly to complete the door opening operation; at this time, the locking member is still in the unlocking station. In the process of closing the door body assembly, the work position of the locking member can be switched again after the door body assembly is directly closed, so that the locking member is connected to the fixing member for restraining.

Furthermore, as soon as the user switches the locking member to the locking position when the door body assembly is opened, the first elastic member abuts the locking member and the driving member, so that the locking member and the driving member are elastically connected. In this way, the user does not need to switch the station of the locking member in advance to ensure that the locking member can still connect with the fixing member for restraining during the close of the door body assembly.

When the lock structure is damaged, it is possible to disassemble the lock structure from cavity body assembly or door body assembly, so as to avoid the case where the cooking appliance cannot be switched on or off due to lock structure damage and improve the user convenience for the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible design, the cavity body assembly comprises a cavity body; a cover body surrounding at least a portion of the cavity body.

In this design, the cavity body assembly comprises a cavity body and a cover body. The cavity body is provided with a cooking cavity, and the cooking cavity is used for placing the food to be cooked; the cover body surrounds at least a portion of the cavity body, thereby providing good protection for the cavity body. In addition, there is a certain mounting cavity between the cavity body and the cover body, so that the relevant components of the cooking appliance are mounted in the mounting cavity between the cavity body and the cover body.

In one possible design, the door body assembly further comprises a door body; a door seal connected to the door body; a lock catch provided in the door body, or the door seal for an open-close connection with the cavity body assembly.

In this design, the door body assembly comprises a door body, a door seal, and a lock catch. The door body is connected with the cavity body assembly and can be used to open or close the cooking cavity; the door seal interfaces with the door body and provides a good seal when the door body closes the cooking cavity to ensure that the cooking cavity seals well during operation. In addition, the lock catch is provided with a door body or a door seal to open and close with the cavity body assembly. When the door body closes the cooking cavity, the lock catch connects to the cavity body assembly to ensure the connection between the door body assembly and the cavity body assembly.

For example, in the cooking appliance provided in the present disclosure, the door body assembly comprises a lock catch, and the lock catch is used for connecting with the cavity body assembly, thereby ensuring a stable connection between the door body assembly and the cavity body assembly. That is, the cooking appliance provided in the present disclosure can first ensure the connection between the door body assembly and the cavity body assembly via the lock catch, and then can use the locking assembly as the child lock, so that the locking assembly cooperates with the fixing member to further restrict the user from opening the door body assembly.

In one possible design, based on the locking assembly being provided in the cavity body assembly, the mounting portion in the bearing member is connected to the outside surface of the cover body which is provided with a mounting hole, and the bearing portion in the bearing member can pass through the mounting hole.

In this design, the mounting portion is detachably connected to the outside surface of the cover body, and the mounting portion can be detached from the outside surface of the cover body on the outside of the cover body when the lock structure fails to open the door body assembly of the cooking appliance. In such a manner that the locking structure is removed from the outside of the cooking appliance, even if the lock structure is damaged, can open the door body assembly of the cooking appliance by disassembling the lock structure to improve the user convenience to the cooking appliance.

In some possible designs, the fixing member is connected to the door body based on the fixing member being provided in the door body assembly.

In this design, the fixing member can be provided at the door body assembly. When the fixing member is provided in the door body assembly, the fixing member can be connected with the door body. At this time, the locking assembly is provided in the cavity body assembly, thereby ensuring that the locking assembly corresponds to the position of the fixing member. For example, a fastener such as a bolt can be used for connection between the fixing member and the door body, or a snap fit may be used.

In addition, the door body itself has good strength and hardness, and the connection between the fixing member and the door body can further ensure the secure connection of the fixing member and promote the mating stability of the locking assembly and the fixing member, so as to extend the service life of the fixing member and the whole cooking appliance.

In some possible designs, the fixing member is connected to the door seal based on the fixing member being provided in the door body assembly.

In this design, the fixing member can be provided at the door body assembly. When the fixing member is provided in the door body assembly, the fixing member can be connected with the door seal. At this time, the locking assembly is provided in the cavity body assembly, thereby ensuring that the locking assembly corresponds to the position of the fixing member. For example, a fastener such as a bolt can be used for connection between the fixing member and the door seal, or a snap fit may be used.

Additionally, during the use of the cooking appliance, the door seal is in direct contact with the cavity body assembly and is closer to the cavity body assembly than the door body. Thus, mounting the fixing member in the door seal reduces the size requirements for the fixing member and simplifies the construction of the fixing member as well as the entire cooking appliance.

In some possible designs, the fixing member and the door body are of an integrated structure based on the fixing member being provided in the door body assembly.

In this design, the fixing member can be provided at the door body assembly. When a fixing member is provided at the door body assembly, the fixing member and the door body can be an integrated structure. The fixing member and the door body are of an integrated structure, which on the one hand can reduce the use of connectors between the fixing member and the door body, and on the other hand can greatly improve the connection strength between the fixing member and the door body, thereby ensuring the connection stability of the fixing member and the locking member, so as to prolong the service life of the fixing member and the whole cooking appliance.

In some possible designs, the fixing member and the door seal are of an integrated structure based on the fixing member being provided in the door body assembly.

In this design, the fixing member can be provided at the door body assembly. When fixing member is provided at the door body assembly, the fixing member and the door seal can be an integrated structure. The fixing member and the door seal are of an integrated structure, which on the one hand can reduce the use of connectors between the fixing member and the door seal, and on the other hand can greatly improve the connection strength between the fixing member and the door seal, thereby ensuring the connection stability of the fixing member and the locking member, so as to prolong the service life of the fixing member and the whole cooking appliance.

In one possible design, the fixing member is connected to the cavity body based on the fixing member being provided in the cavity body assembly.

In this design, the fixing member can be provided at the cavity body assembly. When the fixing member is provided in the cavity body assembly, the fixing member can be connected with the cavity body. At this time, the locking assembly is provided in the door body assembly, thereby ensuring that the locking assembly corresponds to the position of the fixing member. For example, a fastener such as a bolt can be used for connection between the fixing member and the cavity body, or a snap fit may be used.

In addition, the cavity body assembly itself has good strength and hardness, and the connection between the fixing member and the cavity body can further ensure the secure connection of the fixing member and promote the mating stability of the locking assembly and the fixing member, so as to extend the service life of the fixing member and the whole cooking appliance.

In one possible design, the fixing member is connected to the cover body based on the fixing member being provided in the cavity body assembly.

In this design, the fixing member can be provided at the cavity body assembly. When the fixing member is provided in the cavity body assembly, the fixing member can be connected with the cover body. At this time, the locking assembly is provided in the door body assembly, thereby ensuring that the locking assembly corresponds to the position of the fixing member. For example, a fastener such as a bolt can be used for connection between the fixing member and the cover body, or a snap fit may be used.

In addition, the structure of the cover body is relatively simple, and the connection of the fixing member with the cover body can reduce the mounting difficulty of the fixing member, thus improving the assembly efficiency of the locking assembly and the cooking appliance. Furthermore, the connection between the fixing member and the cover body can reduce the structural and manufacturing requirements of the cavity body and further improve the manufacturing efficiency of the cavity body.

In one possible design, based on the locking assembly being provided in the door body assembly, the mounting portion in the bearing member is connected to the outside surface of the door body which is provided with a mounting hole, and the bearing portion in the bearing member can pass through the mounting hole.

In this design, the mounting portion is detachably connected to the outside surface of the door body, and the mounting portion can be detached from the outside surface of the door body on the outside of the door body when the lock structure fails to open the door body assembly of the cooking appliance. The way to disassemble the lock structure outside the cooking appliance, even if the lock structure is damaged, can open the door body assembly of the cooking appliance by disassembling the lock structure to improve the user convenience of the cooking appliance.

In one possible design, the cooking appliance comprises a wave oven, an oven, a steaming box, or a steaming and roasting integrated machine.

In a third aspect, the present disclosure provides a lock structure comprising: a fixing member; and a locking assembly comprising: a mount; a rotating member, at least a part of the rotating member is provided in the mount, and the rotating member can rotate in the mount; a first elastic member, a second end of the first elastic member linked to the mount; the locking member is connected to the first end of the first elastic member, the first end of the locking member abuts against the rotating member, when the rotating member rotates to the first position, the first elastic member is in an elastic deformation state, the second end of the locking member is locked with the fixing member, and when the rotating member rotates to the second position, the first elastic member is in an original state, and the second end of the locking member is separated from the fixing member; and a driving member provided in the mount used for driving the rotating member to move from the second position to the first position.

The lock structure as provided herein comprises a fixing member and a locking assembly. Among them, the locking assembly and the fixing member can cooperate to play the role of locking to restrain. For example, the lock structure provided in the present disclosure is applicable to the cooking appliance and is used as a child lock for the cooking appliance.

The locking assembly comprises a mount, a rotating member, a first elastic member, and a locking member. The mount is mounted to an external object (such as a door body assembly or a cavity body assembly of the cooking appliance); at least a portion of the rotating member is provided within the mount, and a second end of the first elastic member is connected to the locking member; a second end of the first elastic member is linked to the mount. Thus, the rotating member can be applied to the locking member with a pushing force, at this time, the first elastic member is elastically deformed, and when the rotating member stops pushing the locking member, the first elastic member moves the locking member back. So that the locking member moves relative to the mount driven by the rotating member and the first elastic member, thereby enabling the locking member to lock with the fixing member or separate from the fixing member through the mount.

In the lock structure provided by the present disclosure, the first elastic member abuts the mount and the locking member, thereby achieving a flexible connection between the locking member and the mount. Thus, in the case where the locking assembly is at the locked position, the locking member can still move towards a side of the rotating member due to the presence of the first elastic member.

For example, the fixing member and the locking assembly can be mounted to the cavity body assembly and the door body assembly, respectively, so that, once the user inadvertently closes the locking assembly with the door body assembly opened, the fixing member contacts the locking member when the user closes the door body assembly without switching the locking member station, thereby forcing the locking member to move toward the rotating member side. In this way, on the one hand, the connection for restraining between the locking member and the fixing member can be ensured, and on the other hand, the connection for restraining between the locking member and the fixing member does not require user operation, which greatly improves the convenience of using the locking assembly.

When the door body assembly is in a closed state, the locking member is in a locking station; at this time, the locking member is connected to the fixing member for restraining and the user could not open the door body assembly. The connection for restraining between the locking member and the fixing member is removed before opening the door body assembly; at this time, the locking member is at the unlocking station, and the locking member is separated from the fixing member.

Furthermore, as soon as the user switches the locking member to the locking position when the door body assembly is opened, the first elastic member abuts the locking member and the mount, so that the locking member and the mount are elastically connected. In this way, the user does not need to switch the station of the locking member in advance to ensure that the locking member can still lock with the fixing member during the close of the door body assembly.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly and the fixing member, if the user wants to open the door body assembly, it is necessary to pull the locking member while opening the door body assembly. Thus, on the one hand, the user can be prompted, and on the other hand, the children can be prevented from mistakenly opening the door body assembly, which greatly improves the safety of the cooking appliance.

Therefore, the lock structure provided in the present disclosure cooperates with the fixing member via the locking assembly to enhance the unlocking difficulty of the lock structure, avoid the user, especially children, from opening the door body assembly by mistake, and improve the use security of the cooking appliance to which the lock structure is applied. Furthermore, the flexible connection between the driving member and the locking member can close the door body assembly without driving the locking member and ensure that the connection between the locking member and the fixing member is restrained even if the user mistakenly switches the locking member to the locking position when the door body assembly is opened.

The driving member can drive the rotating member to move from a second position to a first position, when the user stops pressing the rotating member, the driving member drives the rotating member to move to the first position, at this time, the rotating member pushes the locking member to the locked position. It can be ensured that the rotating member can automatically move to the first position by providing a driving member in the mount.

In one possible design, the locking member comprises a first driving inclined surface, wherein the fixing member can abut against the first driving inclined surface to drive the locking member to move relative to the mount.

In this design, the locking member is provided with a first driving inclined surface, which can serve as a guide surface. For example, when the door body assembly of the cooking appliance is in an open state, the locking member is in the locked position, and the user can drive the locking member to move to the unlocked position by pressing the rotating member, however, since the locking member is provided with a first driving inclined surface which can contact the fixing member when the user wants to close the door body assembly, the pushing force of the fixing member to the locking member has a component force that pushes the locking member towards the rotating member, so the locking member can move towards the rotating member, leaving the locking member out of the locked position. When the door body assembly moves to the closed position, the fixing member no longer pushes the locking member, at which time the locking member moves to the locked position with the fixing member under the elastic force action of the first elastic member. By providing the first driving inclined surface on the locking member, in the process of closing the door body assembly, the user is not required to actively switch the locking member to the unlocked position, and the locking member can automatically switch the position, simplifying the operation of the user and further improving the user convenience to the locking member.

In one possible design, the fixing member comprises a second driving inclined surface capable of abutting the locking member to drive the locking member to move relative to the mount.

In this design, the fixing member is provided with a second driving inclined surface, which can serve as a guide surface. For example, when the door body assembly of the cooking appliance is in an open state, the locking member is in the locked position, and the user can drive the locking member to move to the unlocked position by pressing the rotating member, however, since the fixing member is provided with a second driving inclined surface which can contact the locking member when the user wants to close the door body assembly, the pushing force of the fixing member to the locking member has a component force that pushes the locking member towards the rotating member, so the locking member can move towards the rotating member, leaving the locking member out of the locked position. When the door body assembly moves to the closed position, the fixing member no longer pushes the locking member, at which time the locking member moves to the locked position with the fixing member under the elastic force action of the first elastic member. By providing a second driving inclined surface on the fixing member, in the process of closing the door body assembly, the user is not required to actively switch the locking member to the unlocked position, and the locking member can automatically switch the position, simplifying the operation of the user and further improving the user convenience to the locking member.

In one possible design, the driving member comprises a second elastic member, wherein the first end of the second elastic member abuts the rotating member, the second end of the second elastic member is connected to the mount, when the rotating member is located in the first position, the second elastic member is in an original state, and when the rotating member is located in the second position, the second elastic member is in an elastically deformed state.

In this design, the driving member is defined as a second elastic member. The second elastic member is provided within the mount and abuts the rotating member and the mount. Thus, the stability of the locking member is further improved by the cooperation of the first elastic member and the second elastic member.

Before the user press the rotating member, the second elastic member pushes the rotating member to the first position, when the second elastic member is in an original state and the first elastic member is in a compressed state; when the user presses the same to rotate, the second elastic member is in a compressed state and the first elastic member is in an original state.

When the user stops pressing the same to rotate, the second elastic member automatically pushes the rotating member to the position where the locking member is pushed, ensuring that the locking member is stable in the lock position.

In other designs, the driving member may also be an electrically driven structure, such as by a motor or a cylinder to drive the rotating member to rotate.

In one possible design, an elastic coefficient of the second elastic member is greater than the elastic coefficient of the first elastic member.

In this design, since the elastic coefficient of the second elastic member is greater than the elastic coefficient of the first elastic member, the elastic force of the second elastic member is greater than the elastic force of the first elastic member when the shape variables of the first elastic member and the second elastic member are the same or similar. When the user stops pressing the rotating member, ensure that the second elastic member can overcome the elastic force of the first elastic member and push the rotating member to the first position.

In one possible design, the mount comprises a first guide groove and a second guide groove which are provided on two opposite sidewalls of the mount; the rotating member comprises a rotating plate; a first sliding portion provided at a first side of the rotating plate; a second sliding portion provided at a second side of the rotating plate, wherein the first sliding portion and the second sliding portion are capable of sliding backward in the first guide groove and the second guide groove around a rotating center of the rotating plate.

In this design, the first guide groove and the second guide groove are placed on opposite sidewalls in the mount, respectively, the first sliding portion is placed on a first side of the rotating plate, and the first sliding portion extends into and slides within the first guide groove. The second sliding portion is located in a second side of the rotating plate and the second sliding portion extends into and slides within the second guide groove. When the first side of the rotating plate is pressed, the second side of the rotating plate tilts up, and the locking member moves to the unlocked position under an elastic force of the first elastic member. When the user stops pressing the rotating plate, the second elastic member pushes the rotating plate to rotate to move back, and the rotating plate pushes the locking member to move to the lock position.

The first guide groove guides the first sliding portion and the second guide groove guides the second sliding portion so that the rotating plate can rotate in a fixed direction to improve the stability of the rotating plate when rotating.

In one possible design, the locking assembly further comprises a pressing portion capable of sliding within the mount and abutting against the rotating member which is in a first position when the pressing portion is in the original position and the rotating member is in a second position when the pressing portion is in the pressed position.

In this design, the pressing portion can slide in an accommodating portion, and the user can press the pressing portion, so that the pressing portion pushes the rotating member; the surface to be pushed of the pressing portion has a larger area, and the contact area of the pressing portion with the user's hands is larger, which can improve the driving convenience of the user for the locking member. Furthermore, the pressing portion can shield an opening of the mount so as to prevent impurities from entering the mount, and the interior of the lock structure is less likely to get stuck due to impurities, which is beneficial to improving the functional stability of the lock structure.

In one possible design, the pressing portion comprises a press plate in sliding connection with the mount; a pushing portion provided in a press plate, the pushing portion abuts against the rotating member, and the pushing portion and the locking member are located on both sides of the rotating center of the rotating member.

In this design, the press plate is slidingly connected to the mount, ensuring that the press plate can slide stably in a preset direction, so that the pushing portion can push the rotating member stably. The pushing portion and the locking member are located on both sides of the rotating member rotating center, when the user presses the press plate, the pushing portion abuts one side of the rotating center of the rotating member, at this time, the pushing portion pushes the rotating member. When the user stops pressing the press plate, the other side of the rotating center of the rotating member pushes the locking member to move to the lock position. By arranging the pushing portion and the locking member on both sides of the rotating center of the rotating member, the driving convenience for the rotating member can be effectively improved.

In one possible design, the mount can be detachably connected to the mounting surface.

In this design, the mount can be detachably connected to the mounting surface of the cooking appliance, i.e., the mount can be detached from the cooking appliance. When the lock structure is damaged, it is possible to disassemble the lock structure from the mounting surface, so as to avoid the case where the cooking appliance cannot be switched on or off due to the lock structure damage, and improve the user convenience to the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible design, the mount comprises a mounting portion provided with a first opening and a first side surface, and the first side surface is used for detachably connecting with the mounting surface; a bearing portion, wherein a first end of the bearing portion is connected with the first side surface, the bearing portion is provided with a second opening and an accommodating portion in communication, the second opening is located at the second end of the bearing portion, the locking member extends into the accommodating portion via the first opening, and the locking member can move relative to the second opening and is locked to or separated from the fixing member.

In this design, the locking member moves relative to the second opening and locks or disengages from the fixing member, the locking member locks with the fixing member when the locking member extends outward from the second opening, and the locking member disengages from the fixing member when the locking member extends inward from the second opening. The first end of the bearing portion is connected to the mounting portion, and the second end of the bearing portion is provided with a second opening, so that a user needs to press the locking member via the first opening. Furthermore, since the first side surface of the mounting portion can be connected to a mounting surface, the mounting portion is mounted on an outside surface of the cooking appliance. The mounting portion is detachably connected to the outside surface of the cooking appliance, and the mounting portion can be detached from the outside surface of the cooking appliance on the outside of the cooking appliance when the lock structure is damaged so as not to open the door body of the cooking appliance. The removal of the lock structure from the outside of the cooking appliance enables the door body of the cooking appliance to be opened by removing the lock structure even if the lock structure is damaged, further improving the user convenience in using the lock structure.

In one possible design, the mounting portion extends beyond a circumferential edge of the bearing portion, and the mounting portion extending beyond the circumferential edge of the bearing portion is configured to abut against the mounting surface.

In this design, an end portion facing the bearing portion in the mounting portion is a first side surface, the end portion facing the mounting portion in the bearing portion is a second side surface, and the area of the first side surface is greater than the area of the second side surface, so that the mounting portion can extend beyond the circumferential edge of the bearing portion. Since the first side surface of the mounting portion is used in conjunction with the mounting surface, the portion of the mounting portion that protrudes from the circumferential edge of the bearing portion is capable of contacting the mounting surface, the mounting portion and the mounting surface have a larger contact area, improving connection stability of the lock structure and outside surface of the cooking appliance.

In a fourth aspect, the present disclosure provides a cooking appliance, comprising: a cavity body assembly; a door body assembly in open-close connection with a cavity body assembly; the lock structure as in any possible design of the third aspect; wherein the fixing member is provided in one of the cavity body assembly and the door body assembly and the locking assembly is provided in the other of the cavity body assembly and the door body assembly.

The cooking appliance provided herein has the full benefit of the lock structure provided in any of the possible designs described above.

The cooking appliance of the present disclosure comprises a cavity body assembly, a door body assembly, and a lock structure of any of the designs of the above third aspect. The cavity body assembly comprises a cooking cavity, and the cooking cavity is used for placing the food to be cooked; the door body assembly is connected to the cavity body assembly and is used to open or close the cooking cavity. For example, the door body assembly may be rotatably connected to the cavity body assembly or slidably connected to the cavity body assembly. One of the cavity body assembly and the door body assembly is provided with a fixing member, and the other of the cavity body assembly and the door body assembly is provided with a locking assembly, which cooperates with the fixing member to lock the door body assembly to the cavity body assembly. For example, the above-mentioned locking assembly is a child lock and functions as an auxiliary connection.

When the door body assembly is in a closed state, the locking member is in a locking station; at this time, the locking member is connected to the fixing member for restraining and the user could not open the door body assembly. The connection for restraining between the locking member and the fixing member is removed before opening the door body assembly; at this time, the locking member is at the unlocking station, and the locking member is separated from the fixing member.

In the process of opening the door body assembly, the door body assembly can be directly driven to separate from the cavity body assembly to complete the door opening operation; at this time, the locking member is still in the unlocking station. In the process of closing the door body assembly, the work position of the locking member can be switched again after the door body assembly is directly closed so that the locking member is connected to the fixing member for restraining.

Furthermore, as soon as the user switches the locking member to the locking position when the door body assembly is opened, the first elastic member abuts the locking member and the driving member, so that the locking member and the driving member are elastically connected. In this way, the user does not need to switch the station of the locking member in advance to ensure that the locking member can still connect with the fixing member for restraining during the close of the door body assembly.

When the lock structure is damaged, it is possible to disassemble the lock structure from cavity body assembly or door body assembly, so as to avoid the case where the cooking appliance cannot be switched on or off due to lock structure damage and improve the user convenience for the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible design, the cavity body assembly comprises a cavity body; a cover body surrounding at least a portion of the cavity body.

In this design, the cavity body assembly comprises a cavity body and a cover body. The cavity body is provided with a cooking cavity, and the cooking cavity is used for placing the food to be cooked; the cover body surrounds at least a portion of the cavity body, thereby providing good protection for the cavity body. In addition, there is a certain mounting cavity between the cavity body and the cover body, so that the relevant components of the cooking appliance are mounted in the mounting cavity between the cavity body and the cover body.

In one possible design, the door body assembly further comprises a door body; a door seal connected to the door body; a lock catch provided in the door body, or the door seal for opening and closing connection with the cavity body assembly.

In this design, the door body assembly comprises a door body, a door seal, and a lock catch. The door body is connected with the cavity body assembly and can be used to open or close the cooking cavity; the door seal interfaces with the door body and provides a good seal when the door body closes the cooking cavity to ensure that the cooking cavity seals well during operation. In addition, the lock catch is provided with a door body or a door seal to open and close with the cavity body assembly. When the door body closes the cooking cavity, the lock catch connects to the cavity body assembly to ensure the connection between the door body assembly and the cavity body assembly.

For example, in the cooking appliance provided in the present disclosure, the door body assembly comprises a lock catch, and the lock catch is used for connecting with the cavity body assembly, thereby ensuring a stable connection between the door body assembly and the cavity body assembly. That is, the cooking appliance provided in the present disclosure can first ensure the connection between the door body assembly and the cavity body assembly via the lock catch, and then can use the locking assembly as the child lock, so that the locking assembly cooperates with the fixing member to further restrict the user from opening the door body assembly.

In one possible design, based on the locking assembly being provided in the cavity body assembly, the mounting portion in the mount is connected to the outside surface of the cover body which is provided with a mounting hole, and the bearing portion in the mount can pass through the mounting hole.

In this design, the mounting portion is detachably connected to the outside surface of the cover body, and the mounting portion can be detached from the outside surface of the cover body on the outside of the cover body when the lock structure fails to open the door body assembly of the cooking appliance. The way to disassemble the lock structure outside the cooking appliance, even if the lock structure is damaged, can open the door body assembly of the cooking appliance by disassembling the lock structure to improve the user convenience to the cooking appliance.

In some possible designs, the fixing member is connected to the door body based on the fixing member being provided in the door body assembly.

In this design, the fixing member can be provided at the door body assembly. When the fixing member is provided in the door body assembly, the fixing member can be connected with the door body. At this time, the locking assembly is provided in the cavity body assembly, thereby ensuring that the locking assembly corresponds to the position of the fixing member. For example, a fastener such as a bolt can be used for connection between the fixing member and the door body, or a snap fit may be used.

In addition, the door body itself has good strength and hardness, and the connection between the fixing member and the door body can further ensure the secure connection of the fixing member and promote the mating stability of the locking assembly and the fixing member, so as to extend the service life of the fixing member and the whole cooking appliance.

In some possible designs, the fixing member is connected to the door seal based on the fixing member being provided in the door body assembly.

In this design, the fixing member can be provided at the door body assembly. When the fixing member is provided in the door body assembly, the fixing member can be connected with the door seal. At this time, the locking assembly is provided in the cavity body assembly, thereby ensuring that the locking assembly corresponds to the position of the fixing member. For example, a fastener such as a bolt can be used for connection between the fixing member and the door seal, or a snap fit may be used.

Additionally, during the use of the cooking appliance, the door seal is in direct contact with the cavity body assembly and is closer to the cavity body assembly than the door body. Thus, mounting the fixing member in the door seal reduces the size requirements for the fixing member and simplifies the construction of the fixing member as well as the entire cooking appliance.

In some possible designs, the fixing member and the door body are of an integrated structure based on the fixing member being provided in the door body assembly.

In this design, the fixing member can be provided at the door body assembly. When a fixing member is provided at the door body assembly, the fixing member and the door body can be an integrated structure. The fixing member and the door body are of an integrated structure, which on the one hand can reduce the use of connectors between the fixing member and the door body, and on the other hand can greatly improve the connection strength between the fixing member and the door body, thereby ensuring the connection stability of the fixing member and the locking member, so as to prolong the service life of the fixing member and the whole cooking appliance.

In some possible designs, the fixing member and the door seal are of an integrated structure based on the fixing member being provided in the door body assembly.

In this design, the fixing member can be provided at the door body assembly. When fixing member is provided at the door body assembly, the fixing member and the door seal can be an integrated structure. The fixing member and the door seal are of an integrated structure, which on the one hand can reduce the use of connectors between the fixing member and the door seal, and on the other hand can greatly improve the connection strength between the fixing member and the door seal, thereby ensuring the connection stability of the fixing member and the locking member, so as to prolong the service life of the fixing member and the whole cooking appliance.

In one possible design, the fixing member is connected to the cavity body based on the fixing member being provided in the cavity body assembly.

In this design, the fixing member can be provided at the cavity body assembly. When the fixing member is provided in the cavity body assembly, the fixing member can be connected with the cavity body. At this time, the locking assembly is provided in the door body assembly, thereby ensuring that the locking assembly corresponds to the position of the fixing member. For example, a fastener such as a bolt can be used for connection between the fixing member and the cavity body, or a snap fit may be used.

In addition, the cavity body itself has good strength and hardness, and the connection between the fixing member and the cavity body can further ensure the secure connection of the fixing member and promote the mating stability of the locking assembly and the fixing member, so as to extend the service life of the fixing member and the whole cooking appliance.

In one possible design, the fixing member is connected to the cover body based on the fixing member being provided in the cavity body assembly.

In this design, the fixing member can be provided at the cavity body assembly. When the fixing member is provided in the cavity body assembly, the fixing member can be connected with the cover body. At this time, the locking assembly is provided in the door body assembly, thereby ensuring that the locking assembly corresponds to the position of the fixing member. For example, a fastener such as a bolt can be used for connection between the fixing member and the cover body, or a snap fit may be used.

In addition, the structure of the cover body is relatively simple, and the connection of the fixing member with the cover body can reduce the mounting difficulty of the fixing member, thus improving the assembly efficiency of the locking assembly and the cooking appliance. Furthermore, the connection between the fixing member and the cover body can reduce the structural and manufacturing requirements of the cavity body and further improve the manufacturing efficiency of the cavity body.

In one possible design, based on the locking assembly being provided in the door body assembly, the mounting portion in the mount is connected to the outside surface of the cover body which is provided with a mounting hole, and the bearing portion in the mount can pass through the mounting hole.

In this design, the mounting portion is detachably connected to the outside surface of the door body, and the mounting portion can be detached from the outside surface of the door body on the outside of the door body when the lock structure fails to open the door body assembly of the cooking appliance. In such a manner that the locking structure is removed from the outside of the cooking appliance, even if the lock structure is damaged, can open the door body assembly of the cooking appliance by disassembling the lock structure to improve the user convenience to the cooking appliance.

In one possible design, the cooking appliance comprises a wave oven, an oven, a steaming box, or a steaming and roasting integrated machine.

Additional aspects and advantages of the present disclosure will be set forth in part in the description which follows, and in part will be obvious from the description, or may be learned by practice of the present disclosure.

BRIEF DESCRIPTION OF THE DRAWINGS

The above and/or additional aspects and advantages of the present disclosure will become apparent and readily appreciated from the following description of embodiments taken in conjunction with the accompanying drawings of which.

Figure 1:
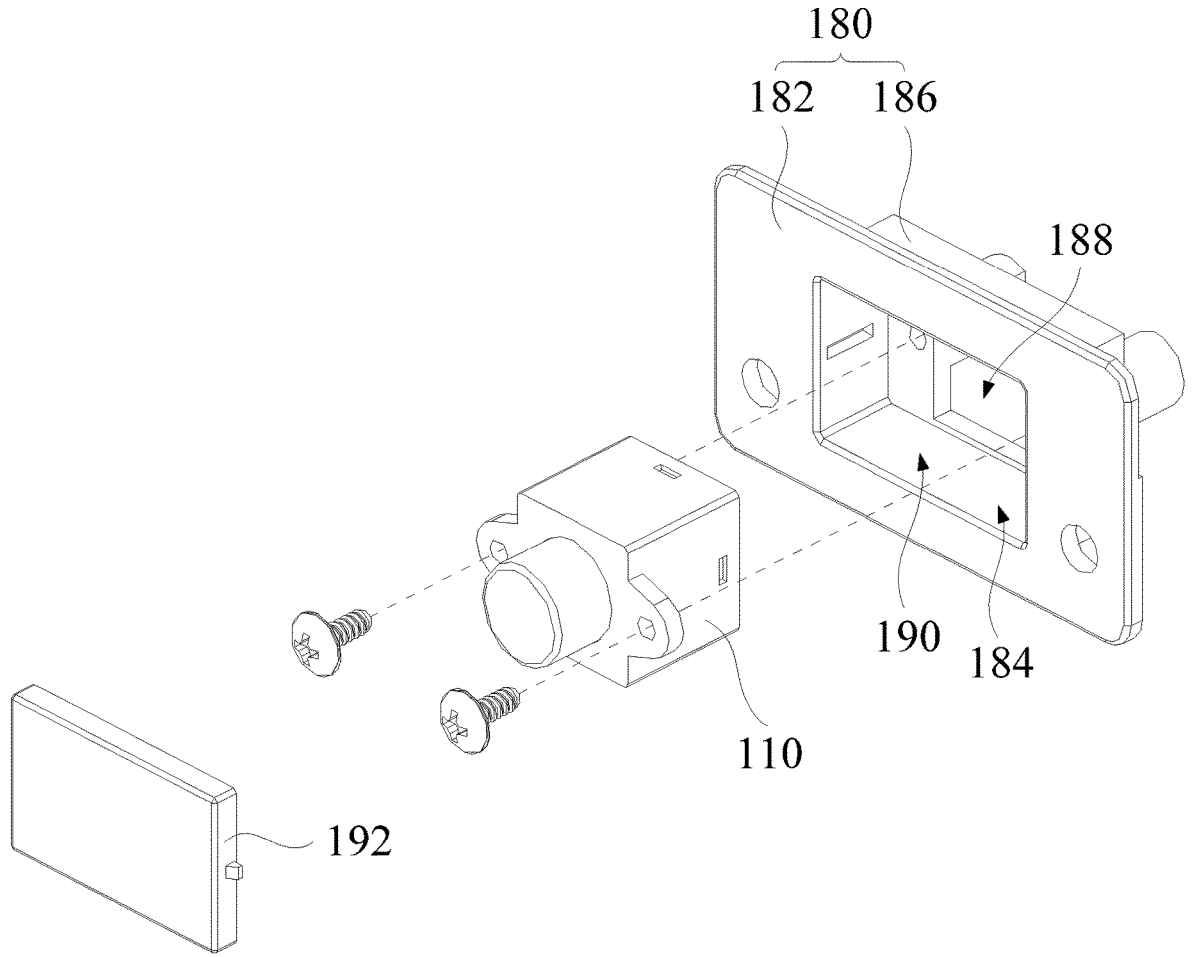
FIG. 1 is an exploded view of a lock structure of an embodiment of the present disclosure.

The corresponding relationship between the reference signs and the component names in FIGS. 1-25 is provided as follows:

102 cavity body assembly, 104 door body assembly, 106 fixing member, 108 locking assembly, 110 first mount, 112 first driving member, 114 first elastic member, 116 locking member, 118 guide structure, 120 pressing member, 122 moving member, 124 first inclined surface, 126 second inclined surface, 128 first protruding portion, 130 second protruding portion, 132 first driving inclined surface, 134 second elastic member, 136 fixing bracket, 138 third opening, 140 cover plate, 142 fourth opening, 144 cavity body, 146 cover body, 148 door body, 150 door seal, 152 lock catch, 166 third protruding portion, 170 guide groove, 180 bearing member, 182 first mounting portion, 184 first opening, 186 first bearing portion, 188 second opening, 190 accommodating portion, 192 baffle, 204 third driving inclined surface, 206 second mount, 208 first guide groove, 210 second guide groove, 212 second mounting portion, 214 fifth opening, 216 second bearing portion, 218 rotating member, 220 rotating plate, 222 first sliding portion, 224 second sliding portion, 226 third elastic member, 228 second driving inclined surface, 230 second driving member, 232 pressing portion, 234 press plate, 236 pushing portion.

DETAILED DESCRIPTION OF THE DISCLOSURE

In order that the above objects, features, and advantages of the present disclosure can be more clearly understood, the present disclosure will be described in further detail below with reference to the accompanying drawings and detailed description. It should be noted that the embodiments and features of the embodiments of the present disclosure may be combined with each other without conflict.

In the following description, numerous specific details are set forth in order to provide a thorough understanding of the present disclosure, however, the present disclosure may be practiced in other ways than those described herein, and therefore the scope of the present disclosure is not restrained by the specific embodiments disclosed below.

Lock structures and cooking appliances provided according to some embodiments of the present disclosure are described below with reference to FIGS. 1-25.

In connection with FIGS. 1, 2, 3, and 4, in some embodiments of the present disclosure, a lock structure is provided. The lock structure comprises a fixing member 106 and a locking assembly 108, wherein the locking assembly 108 comprises a bearing member 180, a first mount 110, a first driving member 112, a first elastic member 114 and a locking member 116, wherein the bearing member 180 can be detachably connected with the mounting surface; the first mount 110 is connected to the bearing member 180; at least a portion of the first driving member 112 is provided within the first mount 110; the first end of the first elastic member 114 is connected to the first driving member 112; the locking member 116 is connected to the second end of the first elastic member 114, and the locking member 116 is capable of moving relative to the first mount 110 under the driving of the first driving member 112 and the first elastic member 114, and locked to or disconnected from the fixing member 106.

The lock structure provided in this embodiment comprises a fixing member 106 and a locking assembly 108. Among other things, the locking assembly 108 and the fixing member 106 may cooperate to function as a lock to restrain. For example, the lock structure provided in the present disclosure is applicable to the cooking appliance and is used as a child lock for the cooking appliance.

For example, the locking assembly 108 comprises a first mount 110, a first driving member 112, a first elastic member 114, and a locking member 116. The first mount 110 is mounted to an external object such as a door body assembly 104 or a cavity body assembly 102 of the cooking appliance; at least a portion of the first driving member 112 is provided within the first mount 110, and the first end of the first elastic member 114 is connected to the first driving member 112; the second end of first elastic member 114 is connected to the locking member 116. Thus, the first driving member 112 may be applied to the locking member 116 via the first elastic member 114 with a pushing force, such that the locking member 116 is driven relative to the first mount 110 by the first driving member 112 and the first elastic member 114, thereby causing the locking member 116 to lock with the fixing member 106 through the first mount 110.

For example, in the lock structure provided by the present disclosure, the first elastic member 114 abuts the first driving member 112 and the locking member 116, thereby enabling a flexible connection between the locking member 116 and the first driving member 112. Thus, with the locking assembly 108 at the locked position, the locking member 116 can still move towards the first driving member 112 side due to the presence of the first elastic member 114.

For example, the fixing member 106 and the locking assembly 108 may be mounted to a cavity body assembly 102 and a door body assembly 104, respectively, such that, once the user inadvertently closes the locking assembly 108 with the door body assembly 104 opened, the fixing member 106 contacts the locking member 116 during the close of the door body assembly 104 by the user without switching the station of the locking member 116, thereby forcing the locking member 116 to move toward a side of the first driving member 112. In this way, on the one hand, the connection for restraining between the locking member 116 and the fixing member 106 can be ensured, and on the other hand, the connection for restraining between the locking member 116 and the fixing member 106 does not require a user operation, which greatly improves the convenience of using the locking assembly 108.

When the door body assembly 104 is in a closed state, the locking member 116 is in a locking station; the locking member 116 is now connected to the fixing member 106 and the user cannot open the door body assembly 104. Before the door body assembly 104 is opened, the connection for restraining between the locking member 116 and the fixing member 106 is released; at this time, the locking member 116 is in an unlocking position, and the locking member 116 is separated from the fixing member 106.

Figure 2:
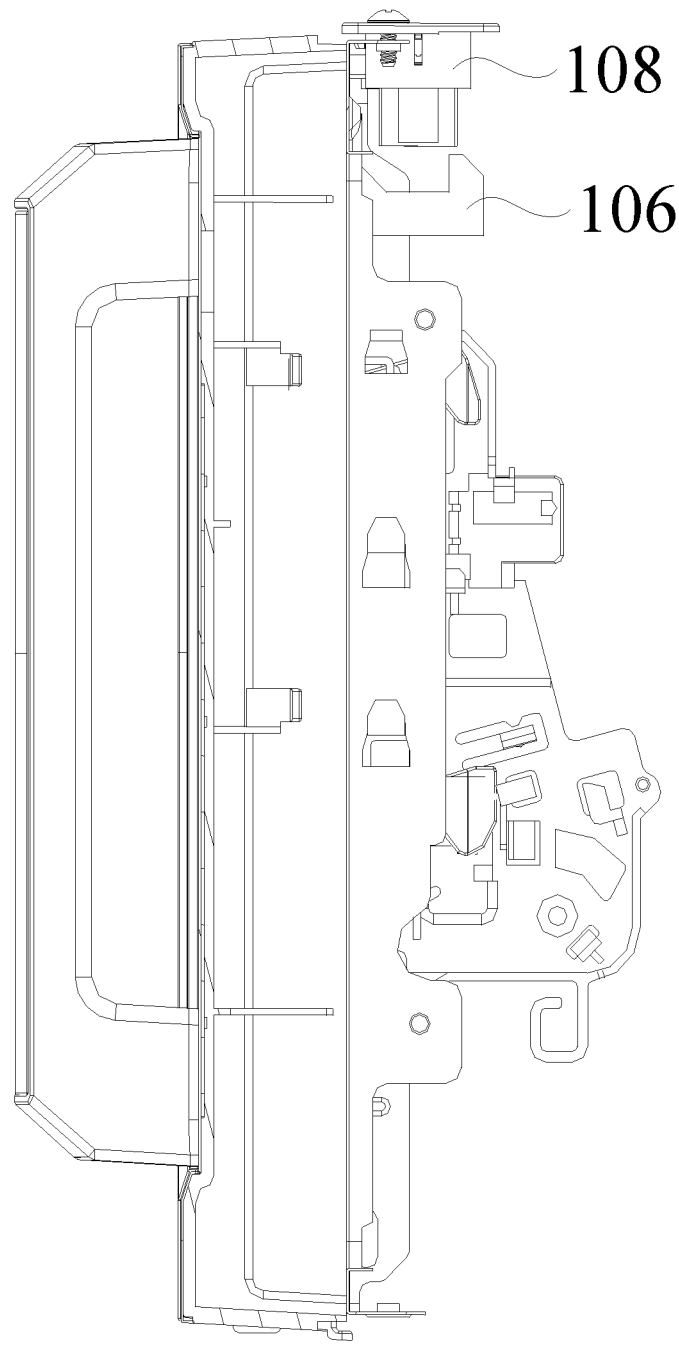
FIG. 2 is one of the structural view of a cooking appliance of an embodiment of the present disclosure.
Figure 3:
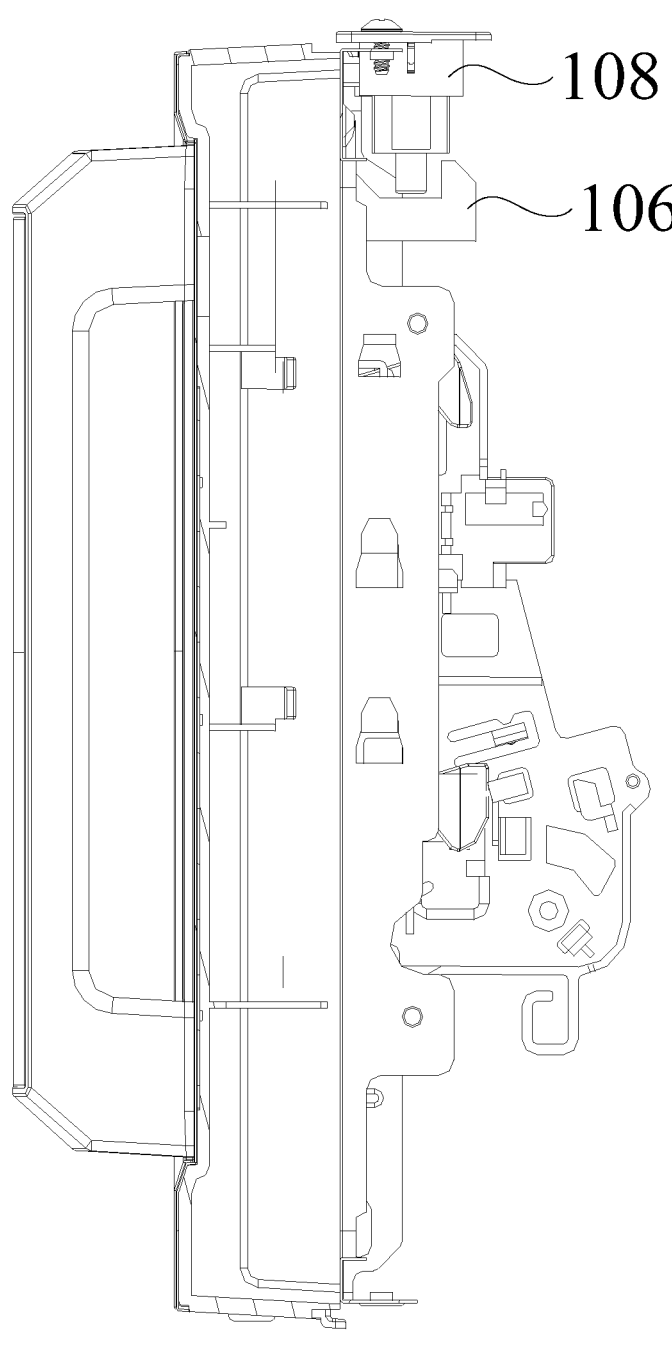
FIG. 3 is a second structural view of a cooking appliance according to an embodiment of the present disclosure.

A state where the locking assembly 108 is separated from the fixing member 106 is shown in FIG. 2, and a state where the locking assembly 108 is locked with the fixing member 106 is shown in FIG. 3.

In the process of opening the door body assembly 104, the door body assembly 104 can be directly driven to separate from the cavity body assembly 102 so as to complete a door opening operation; at this time, the locking member 116 is still in the unlocking station. In the process of closing the door body assembly 104, the work position of the locking member 116 can be switched again after the door body assembly 104 is directly closed so that the locking member 116 is connected to the fixing member 106 for restraining. Furthermore, as soon as the user switches the locking member 116 to the locking station when the door body assembly 104 is opened, the first elastic member 114 makes an elastic connection between the locking member 116 and the first driving member 112 due to the abutment between the locking member 116 and the first driving member 112. In this way, the user does not need to switch the station of the locking member 116 in advance to ensure that the locking member 116 can still lock with the fixing member 106 during the close of the door body assembly 104.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly 108 and the fixing member 106, if the user wants to open the door body assembly 104, it is necessary to pull the locking member 116 while opening the door body assembly 104. Thus, on the one hand, the user can be prompted, and on the other hand, the children can be prevented from mistakenly opening the door body assembly 104, which greatly improves the safety of the cooking appliance.

Therefore, the lock structure provided in the present disclosure cooperates with the fixing member 106 via the locking assembly 108 to enhance the unlocking difficulty of the lock structure, avoid the user, especially children, from opening the door body assembly 104 by mistake, and improve the use security of the cooking appliance to which the lock structure is applied. Furthermore, the flexible connection between the first driving member 112 and the locking member 116 can close the door body assembly 104 without driving the locking member 116 and ensure that the connection between the locking member 116 and the fixing member 106 is restrained even if the user mistakenly switches the locking member 116 to the locking position when the door body assembly 104 is opened.

The bearing member 180 supports the first mount 110 which is mounted to the bearing member 180. The lock structure can be mounted to the cooking appliance. For example, the bearing member 180 can be detachably connected to the mounting surface of the cooking appliance, i.e., the bearing member 180 can be detached from the cooking appliance. When the lock structure is damaged, it is possible to disassemble the lock structure from the mounting surface, so as to avoid the case where the cooking appliance cannot be switched on or off due to the lock structure damage, and improve the user convenience to the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

Figure 14:
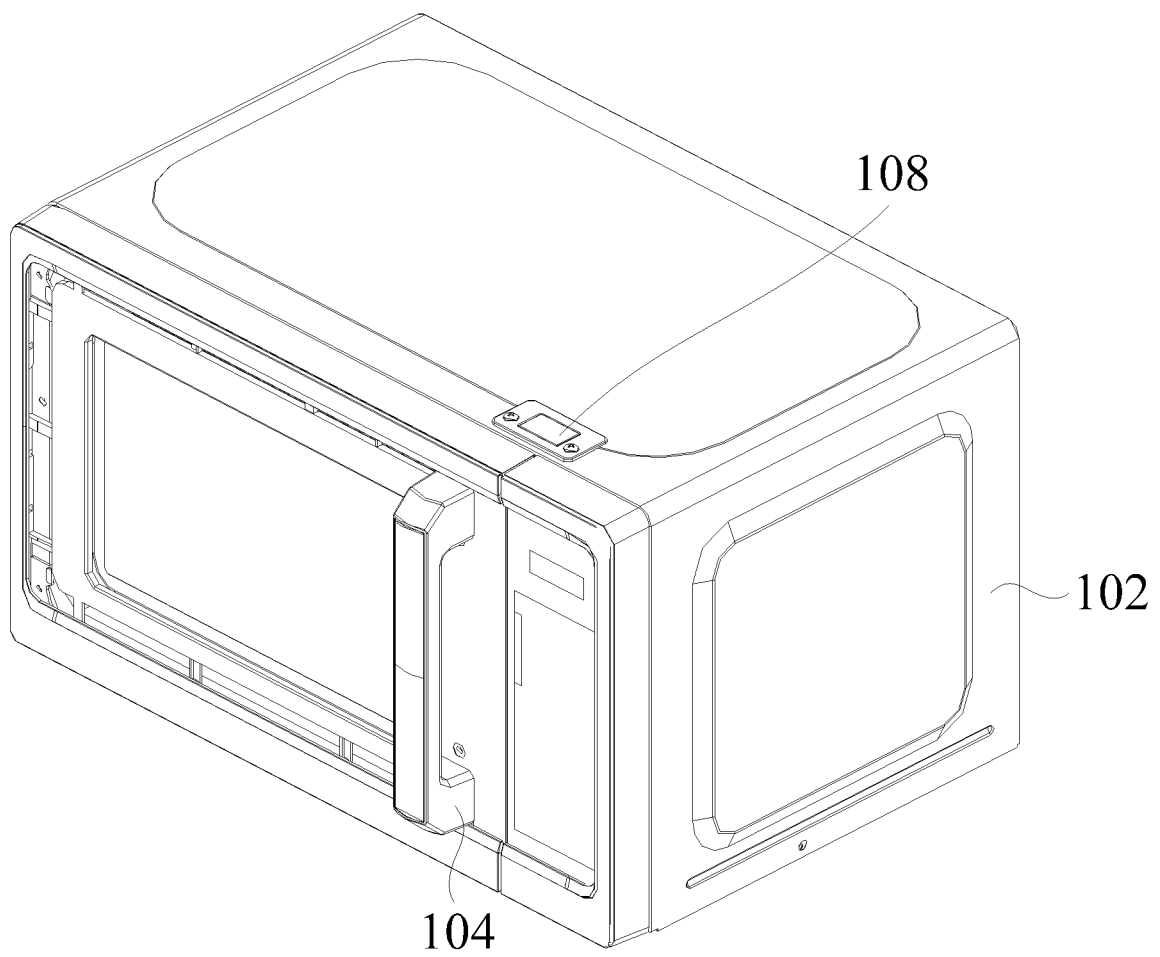
FIG. 14 is a fourth schematic view showing the structure of a cooking appliance according to an embodiment of the present disclosure.
Figure 15:
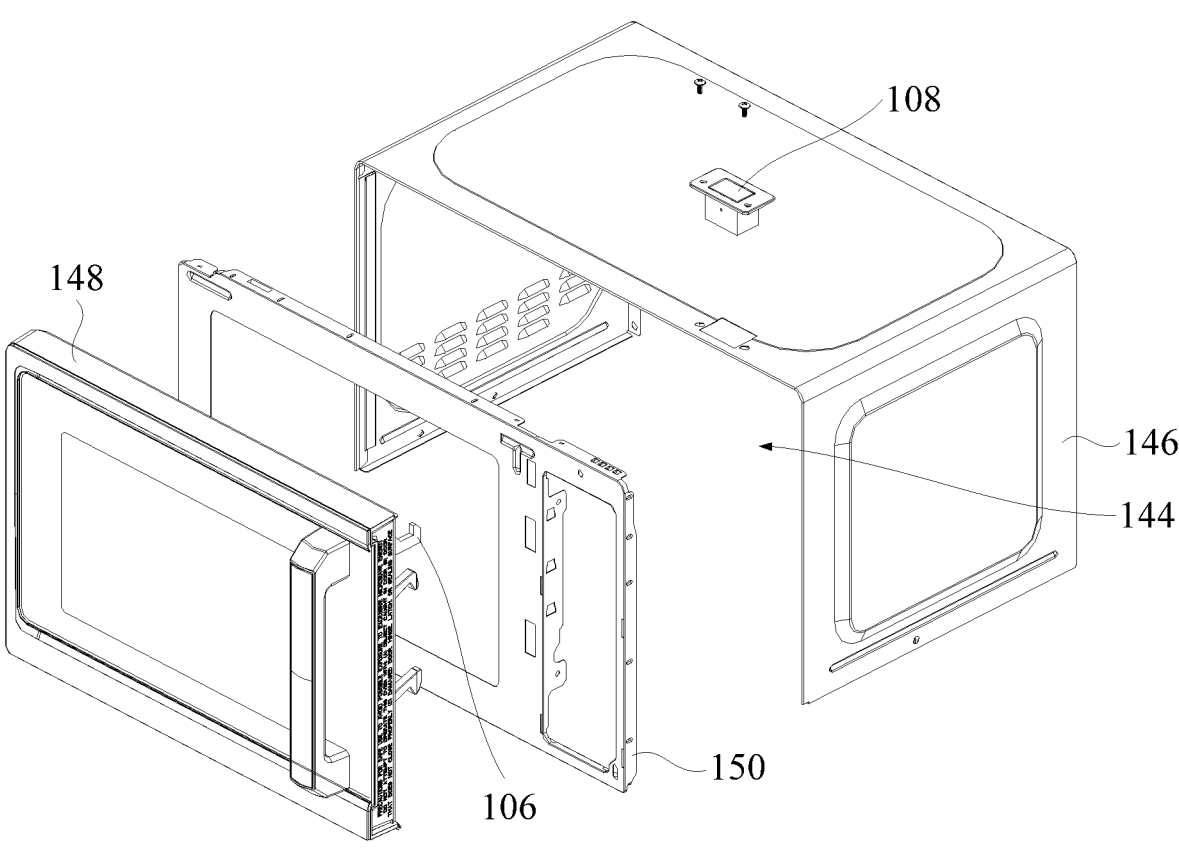
FIG. 15 shows one of the exploded views of a cooking appliance in an embodiment of the present disclosure.

As shown in connection with FIGS. 1 and 14, in one possible embodiment, the bearing member 180 comprises a first mounting portion 182 and a first bearing portion 186, wherein the first mounting portion 182 is provided with a first opening 184, the first mounting portion 182 is provided with a first side surface, and the first side surface is used for detachably connecting with the mounting surface; the first end of the first bearing portion 186 is connected to the first side surface, and the first bearing portion 186 is provided with a second opening 188 and an accommodating portion 190 in communication, wherein the second opening 188 is located at a second end of the first bearing portion 186, the first mount 110 extends into the accommodating portion 190 via the first opening 184, and the locking member 116 can move relative to the second opening 188 and is locked to or separated from the fixing member 106.

In this embodiment, the locking member 116 moves relative to the second opening 188 and engages or disengages from the fixing member 106, the locking member 116 engages the fixing member 106 when the locking member 116 extends outward from the second opening 188, and the locking member 116 disengages from the fixing member 106 when the locking member 116 extends inward from the second opening 188. The first end of the first bearing portion 186 is connected to the first mounting portion 182 and the second end of the first bearing portion 186 is provided with the second opening 188, so the user needs to press the locking member 116 via the first opening 184. Furthermore, since the first side surface of the first mounting portion 182 can be connected to a mounting surface, the first mounting portion 182 is mounted on an outside surface of the cooking appliance. The first mounting portion 182 is detachably connected to the outside surface of the cooking appliance, and the mounting portion 182 can be detached from the outside surface of the cooking appliance on the outside of the cooking appliance when the lock structure is damaged so as not to open the door body of the cooking appliance. The removal of the lock structure from the outside of the cooking appliance enables the door body of the cooking appliance to be opened by removing the lock structure even if the lock structure is damaged, further improving the user convenience in using the lock structure.

In one possible embodiment, as shown in conjunction with FIGS. 1 and 14, the first mounting portion 182 extends beyond the circumferential edge of the first bearing portion 186, and the first mounting portion 182 extending beyond the circumferential edge of the first bearing portion 186 is configured to abut against the mounting surface.

In this embodiment, an end portion of the first mounting portion 182 facing the first bearing portion 186 is a first side surface, an end portion of the first bearing portion 186 facing the first mounting portion 182 is a second side surface, and the area of the first side surface is greater than the area of the second side surface so that the first mounting portion 182 can extend beyond the circumferential edge of the first bearing portion 186. Since the first side surface of the first mounting portion 182 is used in conjunction with the mounting surface, the portion of the first mounting portion 182 that protrudes from the circumferential edge of the first bearing portion 186 is capable of contacting the mounting surface, the first mounting portion 182 and the mounting surface have a larger contact area, improving connection stability of the lock structure and outside surface of the cooking appliance.

In one possible embodiment, the first mount 110 is detachably connected to the first bearing portion 186.

In this embodiment, when one of the first mount 110 and the bearing member 180 is damaged, the first mount 110 may be disassembled from the bearing member 180 so that one of the first mount 110 and the bearing member 180 may be serviced or replaced, further reducing the maintenance cost of the lock structure.

As shown in connection with FIGS. 1 and 14, in one possible embodiment, the bearing member 180 further comprises a baffle 192 connected to the first bearing portion 186, and the baffle 192 can slide within the accommodating portion 190 to push the locking member 116.

In this embodiment, the baffle 192 can slide in the accommodating portion 190, and the user can press the baffle 192, so that the baffle 192 pushes the locking member 116; the surface to be pushed of the baffle 192 has a larger area, and the contact area of the baffle 192 with the user's hands is larger, which can improve the driving convenience of the user for the locking member 116. In addition, the baffle 192 can shield the first opening 184 from impurities entering the accommodating portion 190, and the interior of the lock structure is less likely to become stuck due to impurities, which is beneficial to improving the functional stability of the lock structure.

Figure 4:
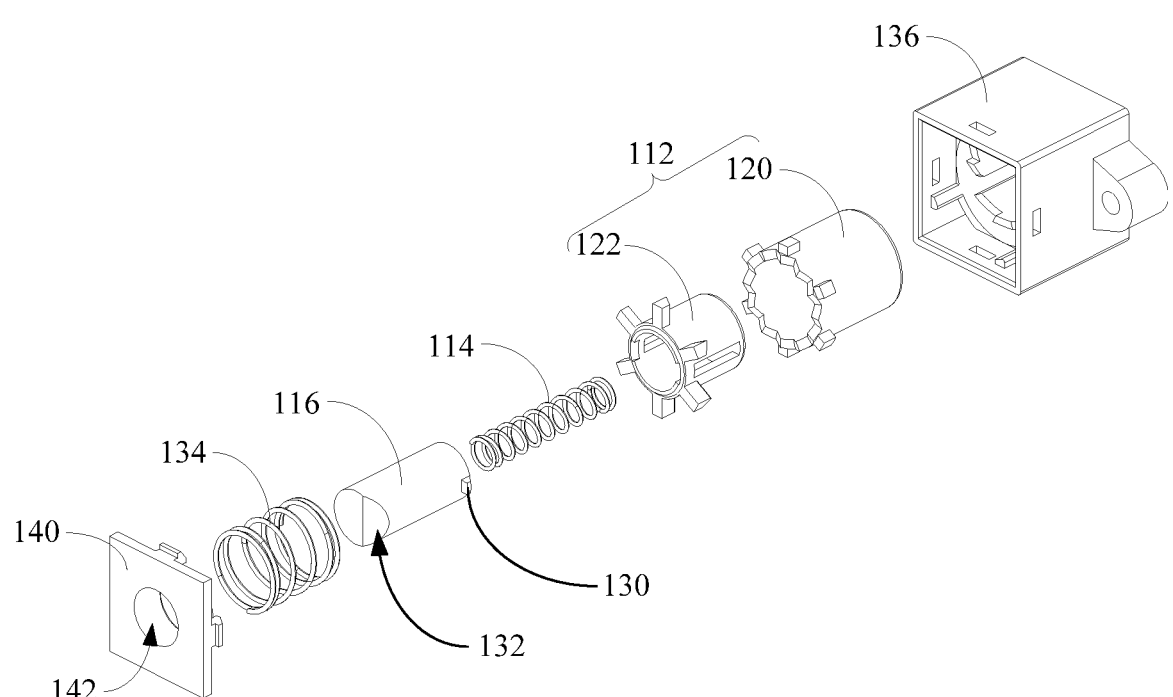
FIG. 4 is one of the exploded views of locking assembly in a lock structure of an embodiment of the present disclosure.
Figure 5:
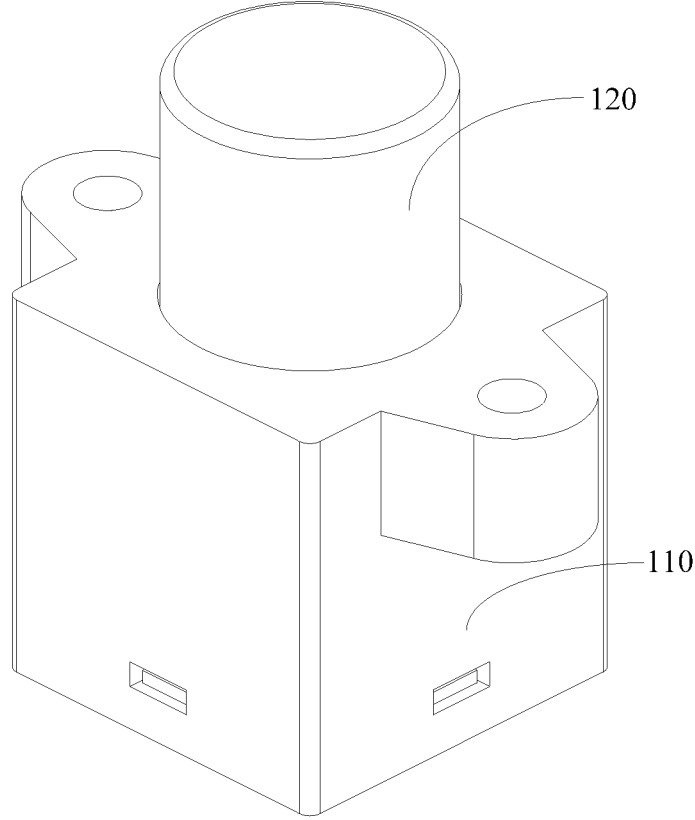
FIG. 5 is a schematic view of the structure of a mount and a pressing member in an embodiment of the present disclosure.
Figure 6:
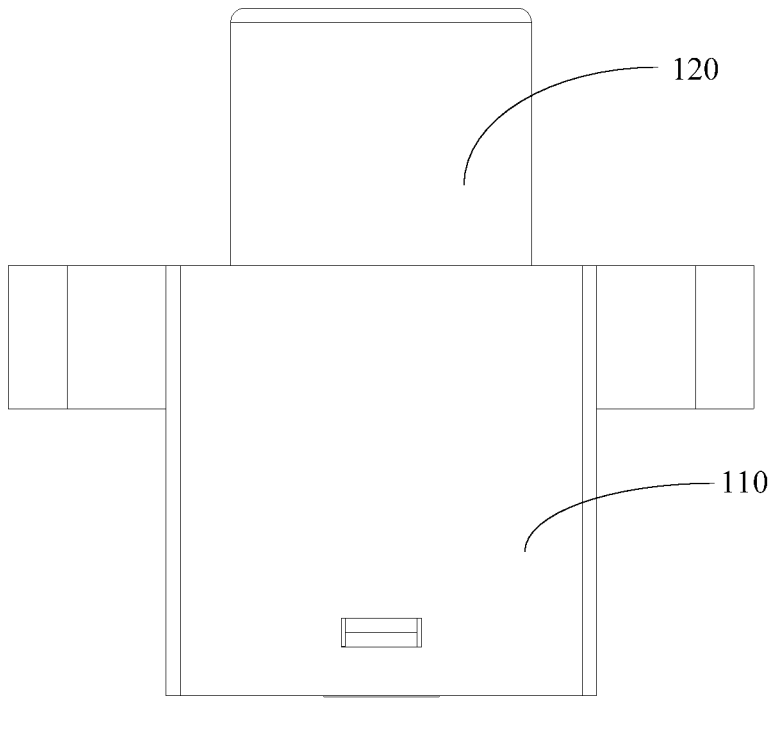
FIG. 6 is a schematic view of the mount and the pressing member shown in FIG. 5 from another perspective.
Figure 7:
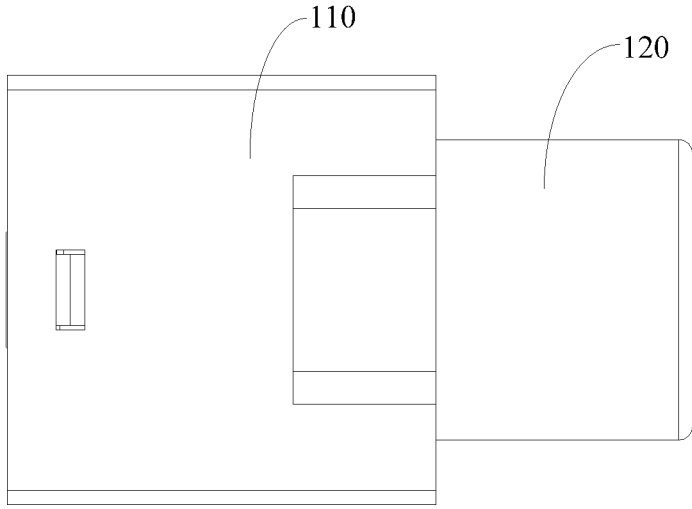
FIG. 7 is a schematic view of the mount and the pressing member shown in FIG. 5 from another perspective.
Figures 8, 9:
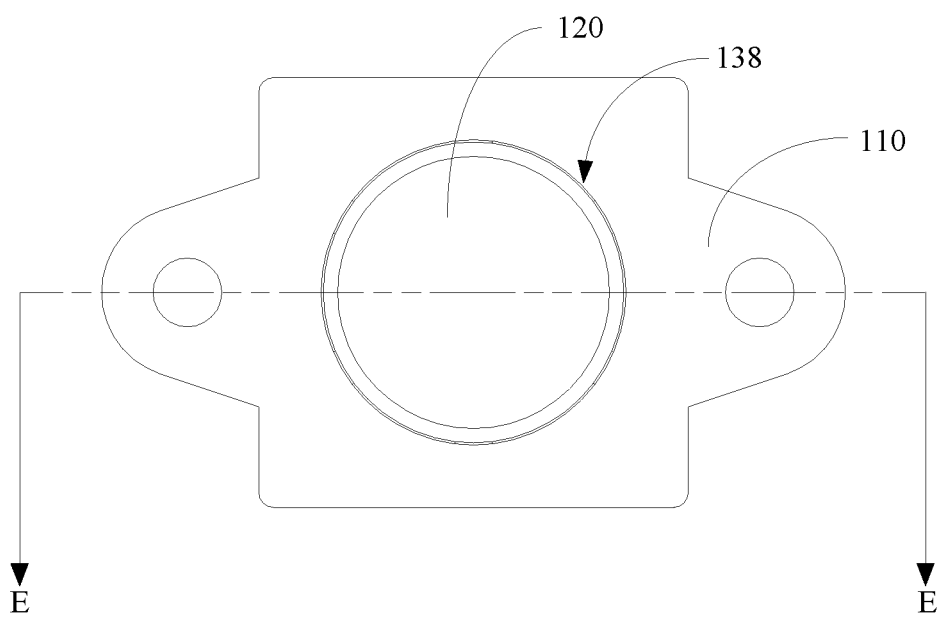
FIG. 8 is a schematic view of the mount and the pressing member shown in FIG. 5 from another perspective.
FIG. 9 is a cross-sectional view along E-E shown in FIG. 8.

In one possible embodiment, as shown in conjunction with FIGS. 1, 4, and 8, the locking assembly 108 further comprises a guide structure 118 provided on the first mount 110, and at least a portion of the first driving member 112 is capable of moving along the guide structure 118 and is restrained to an end portion of the guide structure 118.

In this embodiment, the locking assembly 108 further comprises a guide structure 118. The guide structure 118 is provided inside the mount 110, and at least a portion of the first driving member 112 is slidably connected to the guide structure 118 and is capable of restraining the end portion of the guide structure 118 such that the locking member 116 stays at the locking station.

For example, the end portion of the guide structure 118 is provided with a restraining portion, and at least a portion of the first driving member 112 can move along the guide structure 118; when at least a portion of the first driving member 112 moves to the end portion of the guide structure 118, at least a portion of the first driving member 112 abuts against the restraining portion of the end portion of the guide structure 118, thereby restraining the locking member 116 to the locked position.

For example, the guide structure 118 comprises a guide rib, and the extending direction of the guide rib coincides with the moving direction of the locking member 116; at least a portion of the first driving member 112 can move along the guide rib and at least a portion of the first driving member 112 can abut against the end portion of the guide rib, thereby restraining the locking member 116 to the locked position.

As shown in connection with FIGS. 4, 5, 6, 7, 8, and 9, in one possible embodiment, the first driving member 112 comprises a pressing member 120 and a moving member 122, wherein the pressing member 120 penetrates through the first mount 110 and is movably connected to the first mount 110, and the pressing member 120 comprises a first inclined surface 124; the moving member 122 is slidingly connected to the guide structure 118, the moving member 122 is connected to the first end of the first elastic member 114, and the moving member 122 can be restrained to the end portion of the guide structure 118; wherein the moving member 122 comprises a second inclined surface 126, and the first inclined surface 124 can abut against the second inclined surface 126 so as to drive the moving member 122 to drive the locking member 116 to switch the station.

In this embodiment, the first driving member 112 comprises a pressing member 120 and a moving member 122. The pressing member 120 is movably connected to the first mount 110 and penetrates through the first mount 110; and at least a portion of the pressing member 120 is located throughout the outside surface of the cooking appliance; during the use of the cooking appliance, the station of the locking member 116 can be switched by pressing the pressing member 120. A moving member 122 is provided inside the first mount 110 and is slidably connected to the guide structure 118. In addition, the moving member 122 is connected to the first end of the first elastic member 114 such that the first elastic member 114 is located between the moving member 122 and the locking member 116. Therefore, during the use of the cooking appliance, the user can press the pressing member 120, and the pressing member 120 drives the moving member 122 to operate, and the moving member 122 drives the locking member 116 to switch the station via the first elastic member 114.

Figure 10:
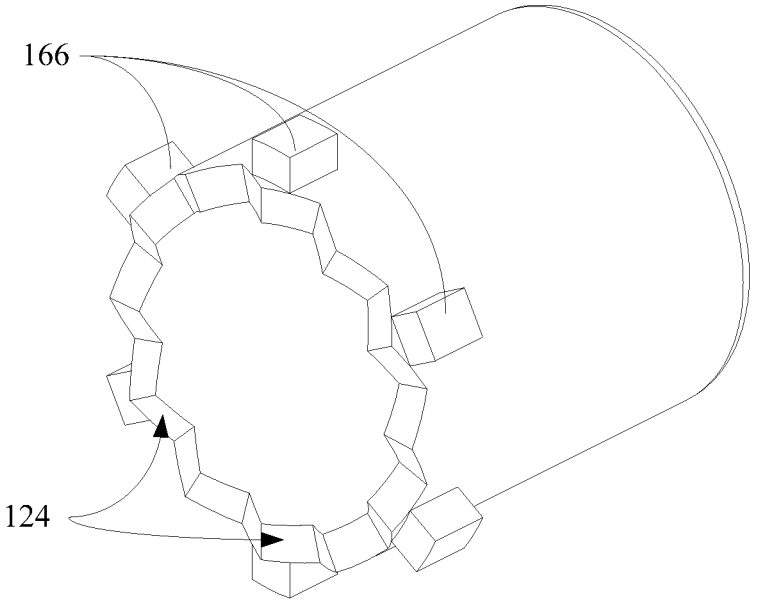
FIG. 10 is a schematic view showing the structure of a pressing member according to an embodiment of the present disclosure.
Figure 11:
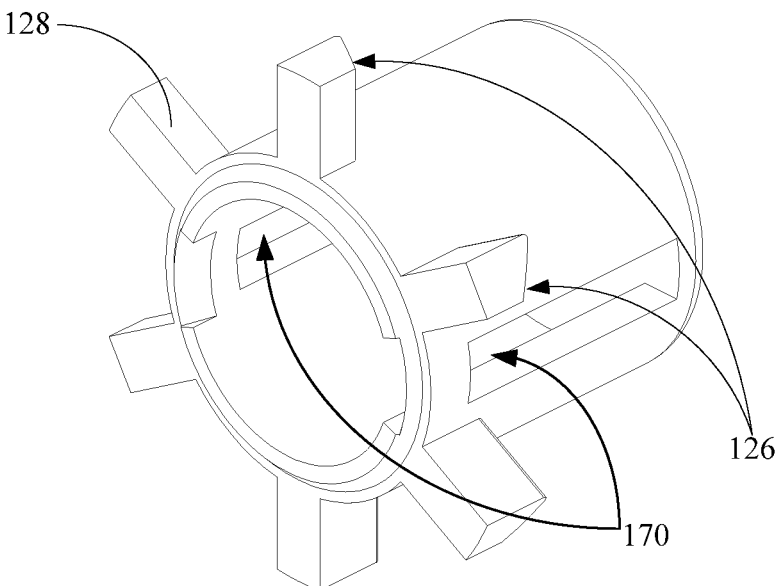
FIG. 11 is a schematic view showing the structure of a moving member according to an embodiment of the present disclosure.

For example, the pressing member 120 comprises a first inclined surface 124 and the moving member 122 comprises a second inclined surface 126, as shown in conjunction with FIGS. 10 and 11. When the user presses the pressing member 120, the first inclined surface 124 of the pressing member 120 contacts the second inclined surface 126 of the moving member 122. When the pressing member 120 is pressed for the first time, the moving member 122 moves along with the guide structure 118; when the moving member 122 moves to the end portion of the guide structure 118, the second inclined surface 126 cooperates with the first inclined surface 124 to drive the moving member 122 to rotate, so that the moving member 122 can abut against the restraining portion, and the locking member 116 is restrained to the locked position. When the pressing member 120 is pressed a second time, the second inclined surface 126 cooperates with the first inclined surface 124 to drive the moving member 122 again to rotate, at which time the moving member 122 moves in a reverse direction along with the guide structure 118, thereby causing the moving member 122 to separate from the restraining portion, and the locking member 116 is switched from the locked position to the unlocked position.

In some possible embodiments, the pressing member 120 comprises a key column, a sidewall of the key column is provided with a third protruding portion 166, and the third protruding portion 166 is used for restraining the key column.

In this embodiment, the pressing member 120 comprises a key column. The sidewall of the key column is provided with a third protruding portion 166, and the third protruding portion 166 can abut against an end portion of the mount 110, thereby ensuring that at least a part of the mounting column is always inside the mount 110, thereby ensuring that the key column is connected to the mount 110.

For example, during use, the first elastic member 114 abuts the locking member 116 and the moving member 122. Thus, by restraining the abutment of the third protruding portion 166 against the first mount 110, it is ensured that the key column does not disengage the first mount 110 under the elastic force action of the first elastic member 114.

In one possible embodiment, as shown in connection with FIGS. 9, 10, and 11, the moving member 122 comprises a sliding jaw sleeve, the sidewall of the sliding jaw sleeve is provided with a first protruding portion 128 which is slidably connected to the guide structure 118 and can abut against the end portion of the guide structure 118, and the second inclined surface 126 is provided at the first protruding portion 128.

In this embodiment, the moving member 122 comprises a sliding jaw sleeve. The sidewall of the sliding jaw sleeve is provided with a first protruding portion 128 which is slidably connected to the guide structure 118, and the first protruding portion 128 can abut against the end portion of the guide structure 118, thereby restraining the locking member 116 to the locked position.

For example, the interior of the key column is hollow and at least a portion of the sliding jaw sleeve can extend into the interior of the key column. In addition, the first inclined surface 124 is at an open end of the key column and a second inclined surface 126 is provided at the first protruding portion 128. When the pressing member 120 is pressed for the first time, the first protruding portion 128 drives the moving member 122 to move along the guide structure 118; when the moving member 122 moves to the end portion of the guide structure 118, the second inclined surface 126 cooperates with the first inclined surface 124 to drive the moving member 122 to rotate, at which time the first protruding portion 128 abuts against the restraining portion and the locking member 116 is retained at the locked position. When the pressing member 120 is pressed a second time, the second inclined surface 126 cooperates with the first inclined surface 124 to again drive the moving member 122 to rotate, at which time the moving member 122 moves in the opposite direction along with the guide structure 118 under the action of the first elastic member 114, thereby separating the first protruding portion 128 from the restraining portion, and the locking member 116 is switched from the locked position to the unlocked position.

In connection with FIGS. 9, 10, and 11, in one possible embodiment, the interior of the moving member 122 is hollow, the sidewall of the moving member 122 is provided with a guide groove 170, and the extending direction of the guide groove 170 coincides with the moving direction of the locking member 116; at least a portion of the locking member 116 is located within the moving member 122, and the sidewall of the locking member 116 is provided with a second protruding portion 130 that is slidably connected to the guide groove 170.

In this embodiment, the interior of the moving member 122 is hollow and at least a portion of the locking member 116 is located inside the moving member 122. In addition, the sidewall of the moving member 122 is provided with the guide groove 170, and the extending direction of the guide groove 170 is consistent with the moving direction of the locking member 116; the locking member 116 is provided with a second protruding portion 130, which is located inside the guide groove 170, so that the second protruding portion 130 is slidably connected with the guide groove 170. In this way, during use, the locking member 116 can move relative to the moving member 122 under the action of the external force, thereby ensuring that even if the user inadvertently closes the locking assembly 108, the locking member 116 can be retracted into the first mount 110 to ensure that the locking member 116 and the fixing member 106 can be connected for restraining.

For example, with the door body assembly 104 opened, the first elastic member 114 abuts the moving member 122 and the locking member 116. At this time, the second protruding portion 130 is in the middle of the guide groove 170 or in the first end of the guide groove 170 near the bottom of the first mount 110 to ensure that the locking member 116 retracts inside the first mount 110 driven by the external force to ensure that the locking member 116 can still lock with the fixing member 106 even if the user inadvertently closes the locking assembly 108.

In addition, during the movement of the locking member 116, the second protruding portion 130 moves along the guide groove 170, and thus plays a certain restraining and guiding role through the cooperation of the second protruding portion 130 and the guide groove 170, so as to improve the running stability of the locking member 116.

As shown in FIG. 4, in one possible embodiment, the locking member 116 further comprises a first driving inclined surface 132, wherein the fixing member 106 can abut against the first driving inclined surface 132 to drive the locking member 116 relative to the first mount 110.

In this embodiment, the locking member 116 further comprises a first driving inclined surface 132. Here, after the door body assembly 104 is opened, if the user falsely triggers the locking assembly 108, the locking member 116 is extended out of the first mount 110. At this time, in the process of closing the door body assembly 104 by the user, the closing of the door body assembly 104 can be directly driven without pressing the pressing member 120 again, which is more convenient for the user operation.

For example, in the process of closing the door body assembly 104 by the user, the fixing member 106 first comes into contact with the first driving inclined surface 132 of the locking member 116, and the first driving inclined surface 132 decomposes the force applied to the locking member 116 by the fixing member 106 into a transverse component force and a vertical component force, wherein the vertical component force can be used to counteract the pushing force applied to the locking member 116 by the first elastic member 114, so that the locking member 116 moves under the action of the above-mentioned vertical component force, so that the locking member 116 returns to the inside of the first mount 110. At this time, the user closes the door body assembly 104.

As shown in connection with FIGS. 4 and 9, in one possible embodiment, the locking assembly 108 further comprises a second elastic member 134 and a second elastic member 134 provided in the first mount 110 and are connected to the first driving member 112 and the first mount 110 for moving the locking member 116 back; wherein at least a part of the first elastic member 114 is located inside the locking member 116, and the second elastic member 134 is sleeved on the locking member 116.

In this embodiment, the locking assembly 108 further comprises a second elastic member 134. The second elastic member 134 is provided within the first mount 110 and abuts against the moving member 122 of the first driving member 112 and the cover plate 140 of the first mount 110. Thus, the stability of the locking member 116 is further improved by the cooperation of the first elastic member 114 and the second elastic member 134.

During the pressing of the pressing member 120, the pressing member 120 presses the second elastic member 134 before the pressing member 120 contacts the moving member 122, when the second elastic member 134 is in a compressed state; after the pressing member 120 contacts the moving member 122, the pressing member 120 compresses both the first elastic member 114 and the second elastic member 134 while both the first elastic member 114 and the second elastic member 134 are in compression.

For example, when the moving member 122 is restrained to the end portion of the guide structure 118, both the first elastic member 114 and the second elastic member 134 in a compressed state apply a pushing force to the moving member 122, thereby enabling the moving member 122 to be stably restrained to the end portion of the guide structure 118. After pressing the pressing member 120 again, the moving member 122 rotates and disengages from an end portion of the guide structure 118; at this time, the first elastic member 114 and the second elastic member 134 cooperate in compression to move the moving member 122 back to the previous position. In this process, due to the cooperation of the above-mentioned first elastic member 114 and second elastic member 134, the pushing force to the first driving member 112 can be greatly improved, thereby further improving the stability of the locking member 116.

Figure 12:
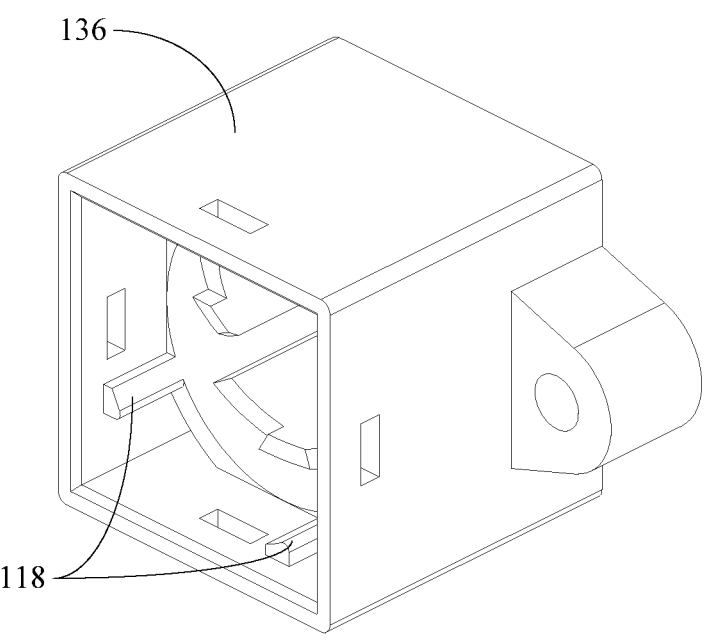
FIG. 12 is a schematic view showing a structure of a fixing bracket according to an embodiment of the present disclosure.
Figure 13:
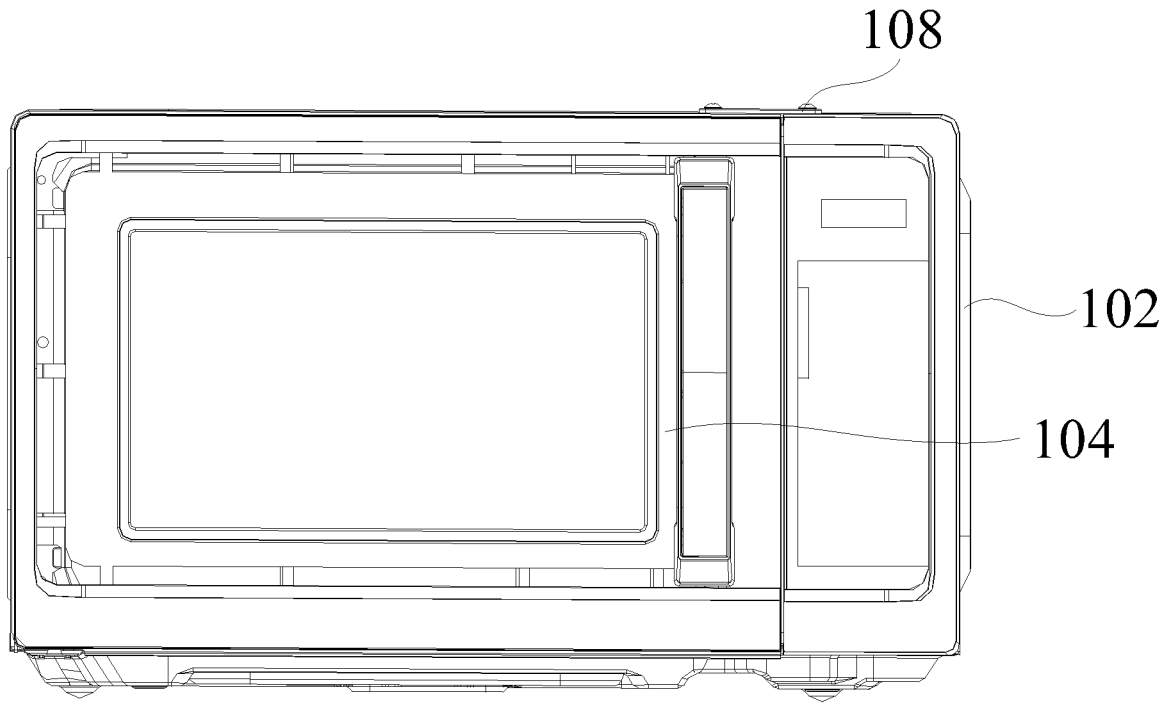
FIG. 13 is a third schematic view showing the structure of a cooking appliance according to an embodiment of the present disclosure.

In one possible embodiment, as shown in conjunction with FIGS. 4, 9, and 12, the first mount 110 comprises a fixing bracket 136, a third opening 138, a cover plate 140, and a fourth opening 142, wherein the third opening 138 is provided on the fixing bracket 136, and the first driving member 112 is provided through the third opening 138; the cover plate 140 is connected to the fixing bracket 136; the fourth opening 142 is provided on the cover plate 140, and the locking member 116 can be provided through the fourth opening 142.

In this embodiment, the first mount 110 comprises a fixing bracket 136, a first opening 184, a cover plate 140, and a second opening 188. The fixing bracket 136 can ensure the stable mounting of the whole locking assembly 108; the cover plate 140 is connected to the fixing bracket 136 such that the cover plate 140 cooperates with the fixing bracket 136 to secure components such as a locking member 116 and a first elastic member 114.

In addition, the fixing bracket 136 is provided with a first opening 184, the cover plate 140 is provided with a second opening 188, and the first opening 184 is provided corresponding to the second opening 188. The pressing part of the locking member 116 is provided through the first opening 184 and is located on the surface of the cooking appliance; the locking member 116 can be driven by the moving member 122 and the first elastic member 114 through the second opening 188 and into a fixing opening of the fixing member 106 to restrain the door body assembly 104.

An inner wall of the fixing bracket 136 is provided with a restraining slot along the circumferential direction; when the moving member 122 moves to the end portion of the guide structure 118, under the cooperation action of the first inclined surface 124 and the second inclined surface 126, the structure provided with the second inclined surface 126 on the moving member is pushed into a restraining slot which restrains the structure provided with the second inclined surface 126, the moving member 122 does no longer move, and the locking member 116 is restrained to the locked position. When the pressing member 120 is pressed a second time, the second inclined surface 126, in cooperation with the first inclined surface 124, again drives the moving member 122 to rotate, and the structure provided with the second inclined surface 126 is pushed out of the restraining slot thereby separating the moving member 122 from the restraining portion, and the locking member 116 is switching from the locked position to the unlocked position.

With reference to FIGS. 1, 13, 14, 15, and 16, in a second aspect, the present disclosure provides a cooking appliance. The cooking appliance comprises a cavity body assembly 102, a door body assembly 104, and the lock structure as in any of the above-mentioned embodiments, wherein the door body assembly 104 is in an open-close connection with the cavity body assembly 102; among these, the fixing member 106 is provided in one of the cavity body assembly 102 and the door body assembly 104, and the locking assembly 108 is provided in the other of the cavity body assembly 102 and the door body assembly 104.

The cooking appliance provided in this example has the full benefit of the lock structure provided in any of the above examples.

The cooking appliance provided in this embodiment comprises a cavity body assembly 102, a door body assembly 104, and a lock structure in any of the embodiments described above. The cavity body '102 assembly comprises a cooking cavity, and the cooking cavity is used for placing the food to be cooked; the door body assembly 104 is connected to the cavity body assembly 102 and is used to open or close the cooking cavity. For example, the door body assembly 104 may be rotatably connected to the cavity body assembly 102 or slidably connected to the cavity body assembly 102. One of the cavity body assembly 102 and the door body assembly 104 is provided with a fixing member 106, and the other of the cavity body assembly 102 and the door body assembly 104 is a locking assembly 108, and the locking assembly 108 cooperates with the fixing member 106 to lock the door body assembly 104 on the cavity body assembly 102. For example, the above-mentioned locking assembly 108 is a child lock and functions as an auxiliary connection.

When the door body assembly 104 is in a closed state, the locking member 116 is in a locking station; the locking member 116 is now connected to the fixing member 106 and the user cannot open the door body assembly 104. Before the door body assembly 104 is opened, the connection for restraining between the locking member 116 and the fixing member 106 is released; at this time, the locking member 116 is in an unlocking position, and the locking member 116 is separated from the fixing member 106.

In the process of opening the door body assembly 104, the door body assembly 104 can be directly driven to separate from the cavity body assembly 102 so as to complete a door opening operation; at this time, the locking member 116 is still in the unlocking station. In the process of closing the door body assembly 104, the work position of the locking member 116 can be switched again after the door body assembly 104 is directly closed, so that the locking member 116 is connected to the fixing member 106 for restraining.

The locking assembly 108 comprises a first mount 110, a first driving member 112, a first elastic member 114, and a locking member 116. The first mount 110 is mounted to an external object such as a door body assembly 104 or a cavity body assembly 102 of the cooking appliance; at least a portion of the first driving member 112 is provided within the first mount 110, and the first end of the first elastic member 114 is connected to the first driving member 112; the second end of first elastic member 114 is connected to the locking member 116. Thus, the first driving member 112 may be applied to the locking member 116 via the first elastic member 114 with a pushing force such that the locking member 116 is driven relative to the first mount 110 by the first driving member 112 and the first elastic member 114, thereby causing the locking member 116 to lock with the fixing member 106 through the first mount 110.

For example, in the lock structure provided by the present disclosure, the first elastic member 114 abuts the first driving member 112 and the locking member 116, thereby enabling a flexible connection between the locking member 116 and the first driving member 112. Thus, with the locking assembly 108 at the locked position, the locking member 116 can still move towards the first driving member 112 side due to the presence of the first elastic member 114.

For example, the fixing member 106 and the locking assembly 108 may be mounted to a cavity body assembly 102 and a door body assembly 104, respectively, such that, once the user inadvertently closes the locking assembly 108 with the door body assembly 104 opened, the fixing member 106 contacts the locking member 116 during the close of the door body assembly 104 by the user without switching the station of the locking member 116, thereby forcing the locking member 116 to move toward a side of the first driving member 112. In this way, on the one hand, the connection for restraining between the locking member 116 and the fixing member 106 can be ensured, and on the other hand, the connection for restraining between the locking member 116 and the fixing member 106 does not require a user operation, which greatly improves the convenience of using the locking assembly 108.

When the door body assembly 104 is in a closed state, the locking member 116 is in a locking station; the locking member 116 is now connected to the fixing member 106 and the user cannot open the door body assembly 104. Before the door body assembly 104 is opened, the connection for restraining between the locking member 116 and the fixing member 106 is released; at this time, the locking member 116 is in an unlocking position, and the locking member 116 is separated from the fixing member 106.

A state where the locking assembly 108 is separated from the fixing member 106 is shown in FIG. 2, and a state where the locking assembly 108 is locked with the fixing member 106 is shown in FIG. 3.

In the process of opening the door body assembly 104, the door body assembly 104 can be directly driven to separate from the cavity body assembly 102 so as to complete a door opening operation; at this time, the locking member 116 is still in the unlocking station. In the process of closing the door body assembly 104, the work position of the locking member 116 can be switched again after the door body assembly 104 is directly closed, so that the locking member 116 is connected to the fixing member 106 for restraining. Furthermore, as soon as the user switches the locking member 116 to the locking station when the door body assembly 104 is opened, the first elastic member 114 makes an elastic connection between the locking member 116 and the first driving member 112 due to the abutment between the locking member 116 and the first driving member 112. In this way, the user does not need to switch the station of the locking member 116 in advance to ensure that the locking member 116 can still lock with the fixing member 106 during the close of the door body assembly 104.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly 108 and the fixing member 106, if the user wants to open the door body assembly 104, it is necessary to pull the locking member 116 while opening the door body assembly 104. Thus, on the one hand, the user can be prompted, and on the other hand, the children can be prevented from mistakenly opening the door body assembly 104, which greatly improves the safety of the cooking appliance.

Therefore, the lock structure provided in the present disclosure cooperates with the fixing member 106 via the locking assembly 108 to enhance the unlocking difficulty of the lock structure, avoid the user, especially children, from opening the door body assembly 104 by mistake, and improve the use security of the cooking appliance to which the lock structure is applied. Furthermore, the flexible connection between the first driving member 112 and the locking member 116 can close the door body assembly 104 without driving the locking member 116 and ensure that the connection between the locking member 116 and the fixing member 106 is restrained even if the user mistakenly switches the locking member 116 to the locking position when the door body assembly 104 is opened.

The bearing member 180 supports the first mount 110 which is mounted to the bearing member 180. The lock structure can be mounted to the cooking appliance. For example, the bearing member 180 can be detachably connected to the mounting surface of the cooking appliance, i.e., the bearing member 180 can be detached from the cooking appliance. When the lock structure is damaged, it is possible to disassemble the lock structure from the mounting surface, so as to avoid the case where the cooking appliance cannot be switched on or off due to the lock structure damage, and improve the user convenience to the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible embodiment, the cavity body assembly 102 comprises a cavity body 144 and a cover body 146 surrounding at least a portion of the cavity body 144.

In this embodiment, the cavity body assembly 102 comprises a cavity body 144 and a cover body 146. The cavity body 144 is provided with a cooking cavity, and the cooking cavity is used for placing the food to be cooked; the cover body 146 surrounds at least a portion of the cavity body 144, thereby providing good protection for the cavity body 144. In addition, there is a certain mounting cavity between the cavity body 144 and the cover body 146, so that the relevant components of the cooking appliance are mounted in the mounting cavity between the cavity body 144 and the cover body 146.

In one possible embodiment, the door body assembly 104 further comprises a door body 148, a door seal 150, and a lock catch 152, wherein the door seal 150 is connected to the door body 148, a lock catch 152 is provided on the door body 148 or the door seal 150 for open-close connection with the cavity body assembly 102.

In this embodiment, the door body assembly 104 comprises a door body 148, a door seal 150, and a lock catch 152. The door body 148 is connected with the cavity body assembly 102 and can be used to open or close the cooking cavity; the door seal 150 interfaces with the door body 148 and provides a good seal when the door body 148 closes the cooking cavity to ensure that the cooking cavity seals well during operation. In addition, the lock catch 152 provides either the door body 148 or the door seal 150 for open-close connection with the cavity body assembly 102. When the door body 148 closes the cooking cavity, the lock catch 152 connects to the cavity body assembly 102 to ensure the connection between the door body assembly 104 and the cavity body assembly 102.

For example, in the cooking appliance provided in the present disclosure, the door body assembly 104 comprises a lock catch 152, and the lock catch 152 is used for connecting with the cavity body assembly 102, thereby ensuring a stable connection between the door body assembly 104 and the cavity body assembly 102. That is, the cooking appliance provided in the present disclosure can first ensure the connection between the door body assembly 104 and the cavity body assembly 102 via the lock catch 152, and then can use the locking assembly 108 as a child lock, so that the locking assembly 108 cooperates with the fixing member 106 to further restrict the user from opening the door body assembly 104.

In one possible embodiment, based on the placement of the locking assembly 108 in the cavity body assembly 102, the first mounting portion 182 in the bearing member 180 is connected to the outside surface of the cover body 146 on which a mounting hole is placed, and the first bearing portion 186 in the bearing member 180 penetrates through the mounting hole.

In this embodiment, the first mounting portion 182 is detachably connected to the outside surface of the cover body 146, and the first mounting portion 182 can be detached from the outside surface of the cover body 146 on the outside of the cover body 146 when the lock structure fails to open the door body assembly 104 of the cooking appliance. In such a manner that the locking structure is removed from the outside of the cooking appliance, even if the lock structure is damaged, can open the door body assembly 104 of the cooking appliance by disassembling the lock structure to improve the user convenience to the cooking appliance.

In some possible embodiments, the fixing member 106 is connected to the door body 148 based on the fixing member 106 being provided on the door body assembly 104.

In this embodiment, the fixing member 106 may be provided at the door body assembly 104. The fixing member 106 is provided in the door body assembly 104, it may be that the fixing member 106 is connected to the door body 148. At this time, the locking assembly 108 is provided in the cavity body assembly 102, thereby ensuring that the locking assembly 108 corresponds to the position of the fixing member 106. For example, a fastener such as a bolt can be used for connection between the fixing member 106 and the door body 148, or a snap fit may be used.

In addition, the door body 148 itself has good strength and hardness, and connecting the fixing member 106 with the door body 148 can further ensure the secure connection of the fixing member 106 and improve the mating stability of the locking assembly 108 and the fixing member 106, so as to extend the service life of the fixing member 106 and the whole cooking appliance.

In some possible embodiments, the fixing member 106 is connected to the door seal 150 based on the fixing member 106 being provided on the door body assembly 104.

In this embodiment, the fixing member 106 may be provided at the door body assembly 104. Where the fixing member 106 is provided in the door body assembly 104, it may be that the fixing member 106 is connected to the door seal 150. At this time, the locking assembly 108 is provided in the cavity body assembly 102, thereby ensuring that the locking assembly 108 corresponds to the position of the fixing member 106. For example, a fastener such as a bolt can be used for connection between the fixing member 106 and the door seal 150, or a snap fit may be used.

Additionally, during the use of the cooking appliance, the door seal 150 is in direct contact with the cavity body assembly 102 and is closer to the cavity body assembly 102 than the door body 148. Thus, mounting the fixing member 106 in the door seal 150 reduces the size requirements for the fixing member 106 and simplifies the construction of the fixing member 106 as well as the entire cooking appliance.

In some possible embodiments, the fixing member 106 and the door body 148 are of an integrated structure based on the providing of the fixing member 106 to the door body assembly 104.

In this embodiment, the fixing member 106 may be provided at the door body assembly 104. When the fixing member 106 is provided in the door body assembly 104, the fixing member 106 and the door body 148 can be an integrated structure. The fixing member 106 and the door body 148 are of an integrated structure, which on the one hand can reduce the use of connectors between the fixing member 106 and the door body 148, and on the other hand can greatly improve the connection strength between the fixing member 106 and the door body 148, thereby ensuring the connection stability of the fixing member 106 and the locking member 116, so as to prolong the service life of the fixing member 106 and the whole cooking appliance.

In some possible embodiments, the fixing member 106 and the door seal 150 are of an integrated structure based on the fixing member 106 being placed in the door body assembly 104.

In this embodiment, the fixing member 106 may be provided at the door body assembly 104. When the fixing member 106 is provided in the door body assembly 104, the fixing member 106 and the door seal 150 are of an integrated structure. The fixing member 106 and the door seal 150 are of an integrated structure, which on the one hand can reduce the use of connectors between the fixing member 106 and the door seal 150, and on the other hand can greatly improve the connection strength between the fixing member 106 and the door seal 150, thereby ensuring the connection stability of the fixing member 106 and the locking member 116, so as to prolong the service life of the fixing member 106 and the whole cooking appliance.

In one possible embodiment, the fixing member 106 is connected to the cavity body 144 based on the fixing member 106 being provided on the cavity body assembly 102.

In this embodiment, the fixing member 106 may be provided at the cavity body assembly 102. The fixing member 106 is provided in the cavity body assembly 102, it may be that the fixing member 106 is connected to the cavity body 144. At this time, the locking assembly 108 is provided in the door body assembly 104, thereby ensuring that the locking assembly 108 corresponds to the position of the fixing member 106. For example, a fastener such as a bolt can be used for connection between the fixing member 106 and the cavity body 144, or a snap fit may be used.

In addition, the cavity body assembly 102 itself has good strength and hardness, and connecting the fixing member 106 with the cavity body 144 can further ensure the secure connection of the fixing member 106 and improve the mating stability of the locking assembly 108 and the fixing member 106, so as to extend the service life of the fixing member 106 and the whole cooking appliance.

In one possible embodiment, the fixing member 106 is connected to the cover body 146 based on the fixing member 106 being provided on the cavity body assembly 102.

In this embodiment, the fixing member 106 may be provided at the cavity body assembly 102. The fixing member 106 is provided in the cavity body assembly 102, it may be that the fixing member 106 is connected to the cover body 146. The locking assembly 108 is now provided in the door body assembly 104, thereby ensuring that the locking assembly 108 corresponds to the location of the fixing member 106. For example, a fastener such as a bolt can be used for connection between the fixing member 106 and the cover body 146, or a snap fit may be used.

In addition, the structure of the cover body 146 is relatively simple, and the connection of the fixing member 106 with the cover body 146 can reduce the mounting difficulty of the fixing member 106, thus improving the assembly efficiency of the locking assembly 108 and the cooking appliance. Furthermore, the connection between the fixing member 106 and the cover body 146 can reduce the structural and manufacturing requirements of the cavity body 144 and further improve the manufacturing efficiency of the cavity body 144.

In one possible embodiment, the first mounting portion 182 in the bearing member 180 is connected to the outside surface of the door body 148 having a mounting hole provided thereon based on the locking assembly 108 provided in the door body assembly 104, and the first bearing portion 186 in the bearing member 180 penetrates through the mounting hole.

In this embodiment, the first mounting portion 182 is detachably connected to the outside surface of the door body 148, and the first mounting portion 182 can be detached from the outside surface of the door body 148 outside of the door body 148 when the lock structure is damaged so that the door body assembly 104 of the cooking appliance cannot be opened. The way to disassemble the lock structure outside the cooking appliance, even if the lock structure is damaged, can open the door body assembly 104 of the cooking appliance by disassembling the lock structure to improve the user convenience to the cooking appliance.

In one possible embodiment, the cooking appliance comprises a wave oven, an oven, a steaming box, or a steaming and roasting integrated machine.

In connection with FIGS. 17, 18, 19 and 20, in some embodiments of the present disclosure, a lock structure is provided. The lock structure comprises a fixing member 106 and a locking assembly 108, wherein the locking assembly 108 comprises a second mount 206, a rotating member 218, a third elastic member 226, a locking member 116 and a second driving member 230, wherein at least a part of the rotating member 218 is provided in the second mount 206, and the rotating member 218 can rotate in the second mount 206; the second end of the third elastic member 226 is connected to the second mount 206; the locking member 116 is connected to the first end of the third elastic member 226, the first end of the locking member 116 abuts against the rotating member 218, when the rotating member 218 rotates to the first position, the third elastic member 226 is in an elastic deformation state, the second end of the locking member 116 is locked with the fixing member 106, and when the rotating member 218 rotates to the second position, the third elastic member 226 is in an original state, and the second end of the locking member 116 is separated from the fixing member 106; a second driving member 230 is provided in the second mount 206, and the second driving member 230 is used to drive the rotating member 218 to move from the second position to the first position.

The lock structure provided in this embodiment comprises a fixing member 106 and a locking assembly 108. Among other things, the locking assembly 108 and the fixing member 106 may cooperate to lock to restrain. For example, the lock structure provided in the present disclosure is applicable to the cooking appliance and is used as a child lock for the cooking appliance.

For example, the locking assembly 108 comprises a second mount 206, a rotating member 218, a third elastic member 226, and a locking member 116. The second mount 206 is mounted in an external object (such as a door body assembly 104 or a cavity body assembly 102 of the cooking appliance); at least a portion of the rotating member 218 is provided within the second mount 206, the second end of the third elastic member 226 is connected to the locking member 116, and the second end of the third elastic member 226 is connected to the second mount 206. As such, the rotating member 218 can be applied to the locking member 116 with a pushing force, where the third elastic member 226 elastically deforms, and when the rotating member 218 stops pushing the locking member 116, the third elastic member 226 causes the locking member 116 to move back. The locking member 116 is caused to move relative to the second mount 206 driven by the rotating member 218 and the third elastic member 226, thereby causing the locking member 116 to lock with or separate from the fixing member 106 through the second mount 206.

Figure 19:
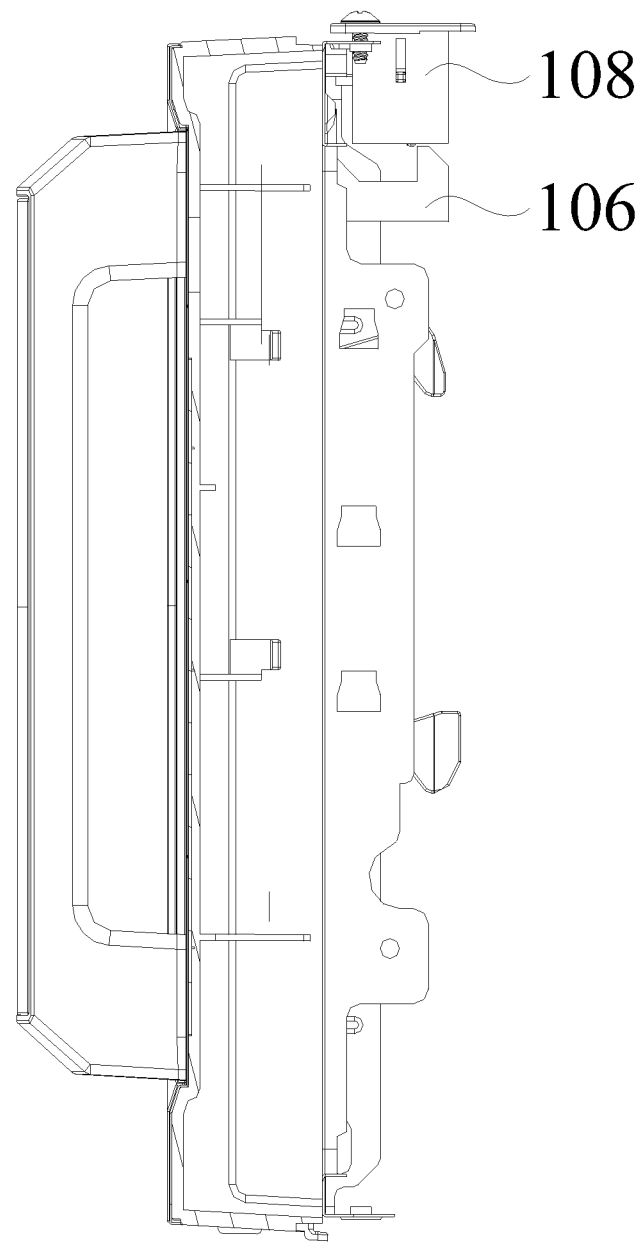
FIG. 19 is a fifth view showing a structure of a cooking appliance according to an embodiment of the present disclosure.
Figure 20:
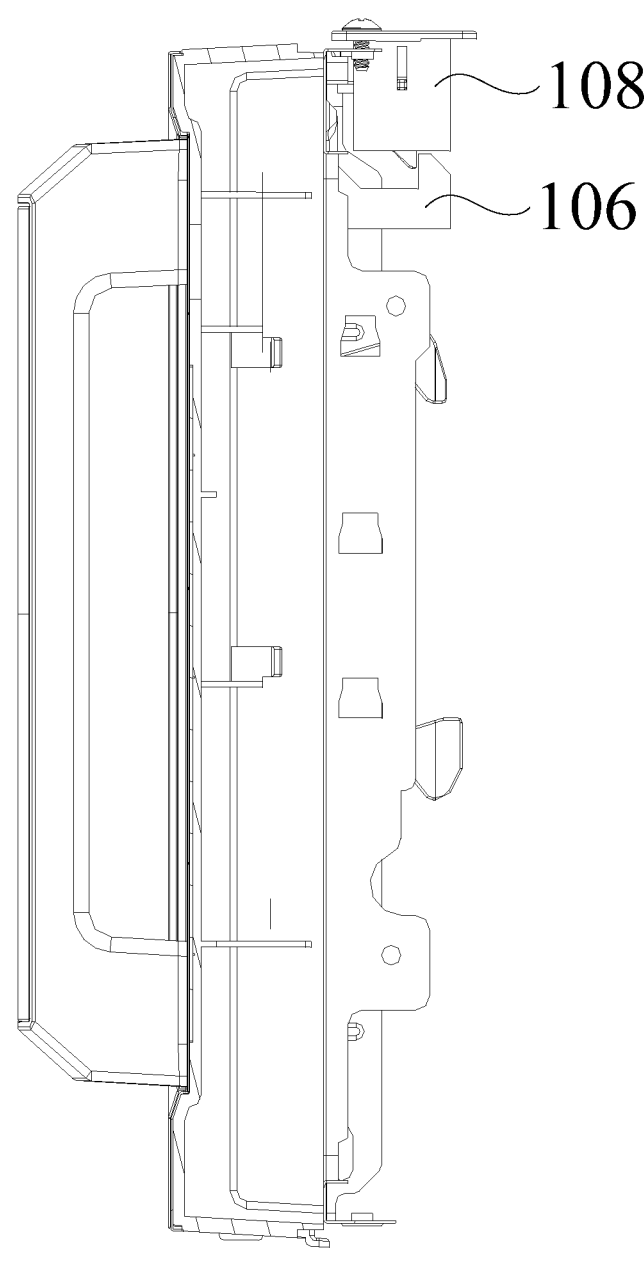
FIG. 20 is a sixth structural view showing a cooking appliance according to an embodiment of the present disclosure.

A state where the locking assembly 108 is separated from the fixing member 106 is shown in FIG. 19, and a state where the locking assembly 108 is locked with the fixing member 106 is shown in FIG. 20.

For example, in the lock structure provided by the present disclosure, the third elastic member 226 abuts the second mount 206 and the locking member 116, thereby enabling a flexible connection between the locking member 116 and the second mount 206. Thus, with the locking assembly 108 at the locked position, the locking member 116 can still move towards a side of the rotating member 218 due to the presence of the third elastic member 226.

For example, the fixing member 106 and the locking assembly 108 may be mounted to a cavity body assembly 102 and a door body assembly 104, respectively, such that, once the user inadvertently closes the locking assembly 108 with the door body assembly 104 opened, the fixing member 106 contacts the locking member 116 during the close of the door body assembly 104 by the user without switching the station of the locking member 116, thereby forcing the locking member 116 to move toward a side of the rotating member 218. In this way, on the one hand, the connection for restraining between the locking member 116 and the fixing member 106 can be ensured, and on the other hand, the connection for restraining between the locking member 116 and the fixing member 106 does not require a user operation, which greatly improves the convenience of using the locking assembly 108.

When the door body assembly 104 is in a closed state, the locking member 116 is in a locking station; the locking member 116 is now connected to the fixing member 106 and the user cannot open the door body assembly 104. The connection for restraining between the locking member 116 and the fixing member 106 is removed before opening the door body assembly 104; at this time, the locking member 116 is at the unlocking station, and the locking member 116 is separated from the fixing member 106.

Once the user switches the locking member 116 to the locking station when the door body assembly 104 is opened, the locking member 116 and the second mount 206 are resiliently connected due to the third elastic member 226 abutting between the locking member 116 and the second mount 206. In this way, the user does not need to switch the station of the locking member 116 in advance to ensure that the locking member 116 can still lock with the fixing member 106 during the close of the door body assembly 104.

For example, the lock structure provided in the present disclosure is applicable to the cooking appliance. After the cooking process of the cooking appliance is finished, the temperature of the food in the cooking cavity is high, and at this time, there is a risk of scalding for the user to directly open the door body to remove the food. Therefore, in the present disclosure, through the cooperation of the above-mentioned locking assembly 108 and the fixing member 106, if the user wants to open the door body assembly 104, it is necessary to pull the locking member 116 while opening the door body assembly 104. Thus, on the one hand, the user can be prompted, and on the other hand, the children can be prevented from mistakenly opening the door body assembly 104, which greatly improves the safety of the cooking appliance.

Therefore, the lock structure provided in the present disclosure cooperates with the fixing member 106 via the locking assembly 108 to enhance the unlocking difficulty of the lock structure, avoid the user, especially children, from opening the door body assembly 104 by mistake, and improve the use security of the cooking appliance to which the lock structure is applied. Furthermore, the flexible connection between the second driving member 230 and the locking member 116 can close the door body assembly 104 without driving the locking member 116 and ensure that the connection between the locking member 116 and the fixing member 106 is restrained even if the user mistakenly switches the locking member 116 to the locking position when the door body assembly 104 is opened.

The second driving member 230 is capable of driving the rotating member 218 to move from the second position to the first position, and when the user stops pressing the rotating member 218, the second driving member 230 drives the rotating member 218 to move to the first position, at which time the rotating member 218 pushes the locking member 116 to the locked position. By providing the second driving member 230 within the second mount 206, it is ensured that the rotating member 218 can automatically move to the second position.

When the lock structure is damaged, it is possible to disassemble the lock structure from cavity body assembly 102 or door body assembly 104, so as to avoid the case where the cooking appliance cannot be switched on or off due to lock structure damage and improve the user convenience for the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

In one possible application, the fixing member 106 is provided with a recess into which a portion of the locking member 116 plugs when the locking member 116 is in the locked position, the locking member 116 and the recess cooperate to restrain the separation of the locking member 116 from the fixing member 106. Alternatively, a through-hole may be provided in the fixing member 106 into which a portion of the locking member 116 plugs when the locking member 116 is in the locked position, and the locking member 116 cooperates with the through-hole to restrain the separation of the locking member 116 from the fixing member 106.

Figure 17:
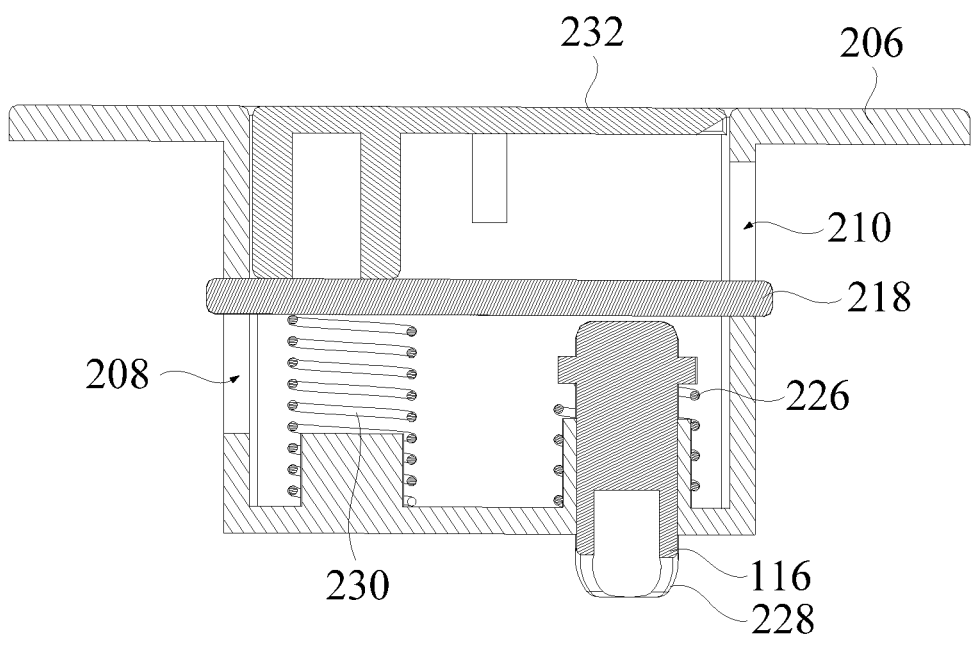
FIG. 17 shows one of the structural schematics of a locking assembly in a lock structure in an embodiment of the present disclosure.

As shown in connection with FIGS. 17 and 20, in one possible embodiment, the locking member 116 further comprises a second driving inclined surface 228, wherein the fixing member 106 can abut against the second driving inclined surface 228 to drive the locking member 116 to move relative to the second mount 206.

In this embodiment, the locking member 116 is provided with a second driving inclined surface 228, which may serve as a guide surface. For example, when the door body assembly 104 of the cooking appliance is in an open state, the locking member 116 is in the locked position, and the user can drive the locking member 116 to move to the unlocked position by pressing the rotating member 218, however, since the locking member 116 is provided with a second driving inclined surface 228, the second driving inclined surface 228 can contact the fixing member 106 when the user wants to close the door body assembly 104. The pushing force of the locking member 116 by the fixing member 106 has a component force that pushes the locking member 116 towards the rotating member 218, so the locking member 116 can move towards the rotating member 218, causing the locking member 116 to disengage from the locked position. When the door body assembly 104 is moved to the closed position, the fixing member 106 no longer pushes on the locking member 116, at which time the locking member 116 is moved to a locked position with the fixing member 106 under the elastic force action of the third elastic member 226. By providing a second driving inclined surface 228 on a locking member 116, during the process of closing the door body assembly 104, the user is not required to actively switch the locking member 116 to the unlocked position, and the locking member 116 can automatically switch positions, simplifying the operation of the user, and further improving the user convenience to the locking member 116.

Figure 16:
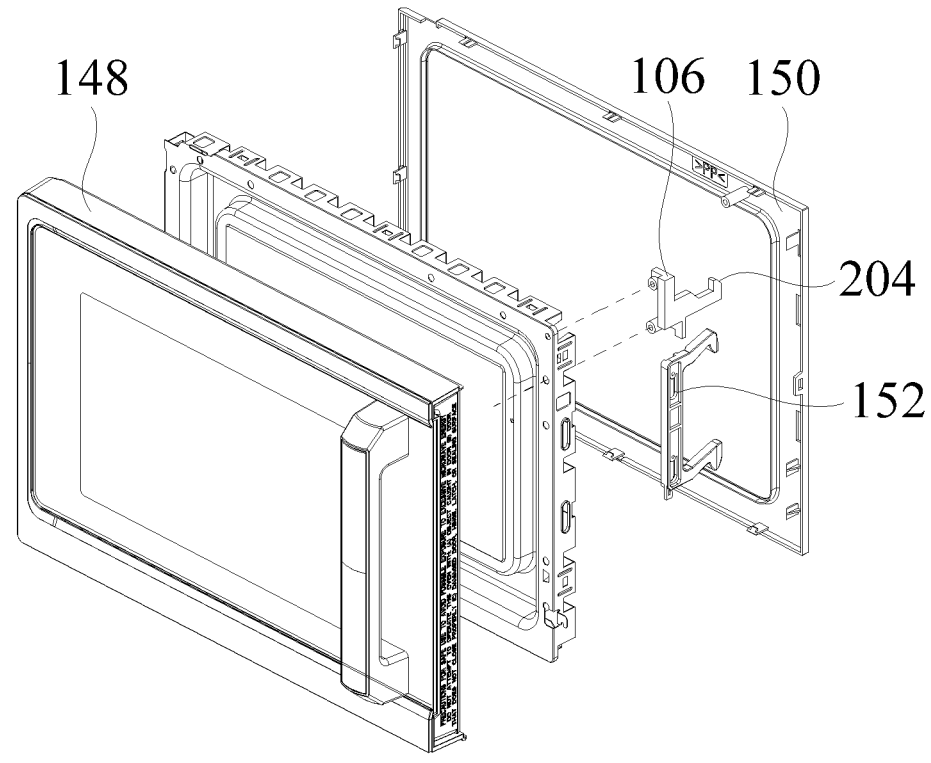
FIG. 16 shows a second exploded view of a cooking appliance in an embodiment of the present disclosure.

As shown in connection with FIGS. 16 and 20, in one possible embodiment, the fixing member 106 comprises a third driving inclined surface 204 which can abut against the locking member 116 to drive the locking member 116 relative to the second mount 206.

In this embodiment, the locking member 116 is provided with a second driving inclined surface 228, the fixing member 106 is provided with a third driving inclined surface 204, and the second driving inclined surface 228 and the third driving inclined surface 204 may function as guide surfaces. For example, when the door body assembly 104 of the cooking appliance is in an open state, the locking member 116 is in the locked position, and the user can drive the locking member 116 to move to the unlocked position by pressing the rotating member 218, however, since the locking member 116 is provided with a second driving inclined surface 228 and a fixing member 106 is provided with a third driving inclined surface 204, the user wants to close the door body assembly 104. The second driving inclined surface 228 and the third driving inclined surface 204 are in contact, and the second driving inclined surface 228 and the third driving inclined surface 204 are capable of sliding relative to each other; the locking member 116 is thus capable of moving move toward the rotating member 218, causing the locking member 116 to disengage from the locked position. When the door body assembly 104 is moved to the closed position, the fixing member 106 no longer pushes on the locking member 116, at which time the locking member 116 is moved to a locked position with the fixing member 106 under the elastic force action of the third elastic member 226. By providing the second driving inclined surface 228 and the third driving inclined surface 204 on the fixing member 106, during the process of closing the door body assembly 104, the user is not required to actively switch the locking member 116 to the unlocked position, and the locking member 116 can automatically switch positions, simplifying the operation of the user, and further improving the user convenience to the locking member 116.

In one possible embodiment, the locking member 116 comprises a second driving inclined surface 228, wherein the fixing member 106 can abut against the second driving inclined surface 228; the fixing member 106 comprises a third driving inclined surface 204, wherein the third driving inclined surface 204 can abut against the second driving inclined surface 228 of the locking member 116.

In this embodiment, the fixing member 106 is provided with a third driving inclined surface 204, which may serve as a guide surface. For example, when the door body assembly 104 of the cooking appliance is in an open state, the locking member 116 is in the locked position, and the user can drive the locking member 116 to move to the unlocked position by pressing the rotating member 218, however, since the fixing member 106 is provided with the third driving inclined surface 204, the third driving inclined surface 204 can come into contact with the locking member 116 when the user wants to close the door body assembly 104, and the pushing force of the fixing member 106 against the locking member 116 has a component force pushing the locking member 116 toward the rotating member 218, the locking member 116 can move toward the rotating member 218, so that the locking member 116 is out of the locked position. When the door body assembly 104 is moved to the closed position, the fixing member 106 no longer pushes on the locking member 116, at which time the locking member 116 is moved to a locked position with the fixing member 106 under the elastic force action of the third elastic member 226. By providing a third driving inclined surface 204 on a fixing member 106, during the process of closing the door body assembly 104, the user is not required to actively switch the locking member 116 to the unlocked position, and the locking member 116 can automatically switch positions, simplifying the operation of the user, and further improving the user convenience to the locking member 116.

Figure 18:
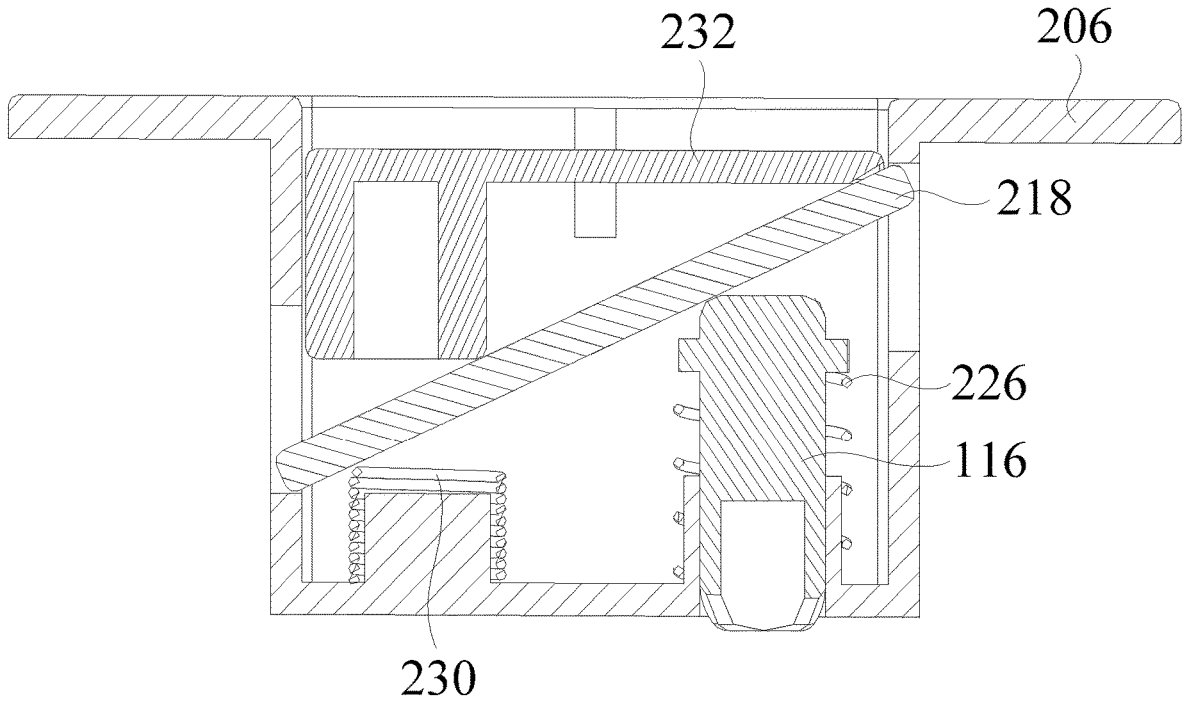
FIG. 18 shows a second schematic view of a locking assembly in a lock structure according to one embodiment of the present disclosure.
Figure 21:
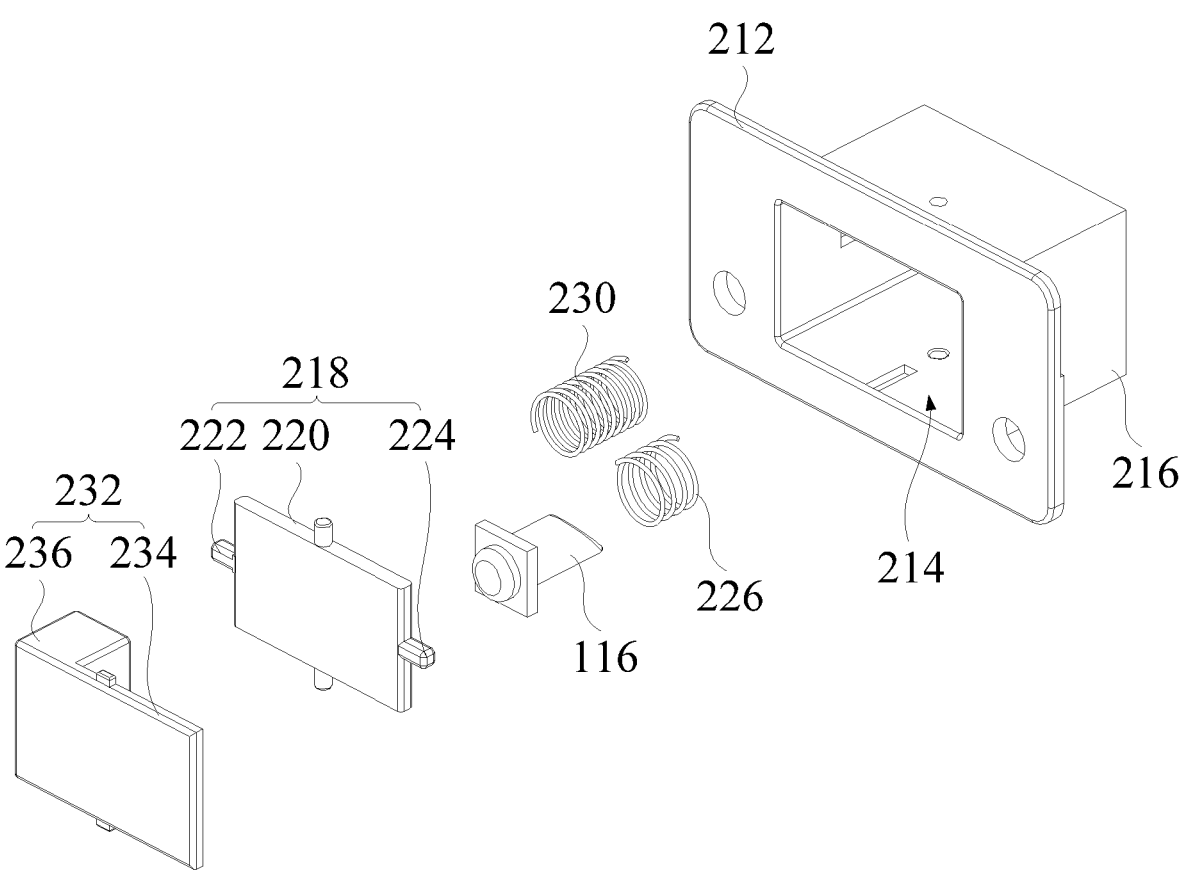
FIG. 21 shows a second exploded view of locking assembly in a lock structure of an embodiment of the present disclosure.
Figure 22:
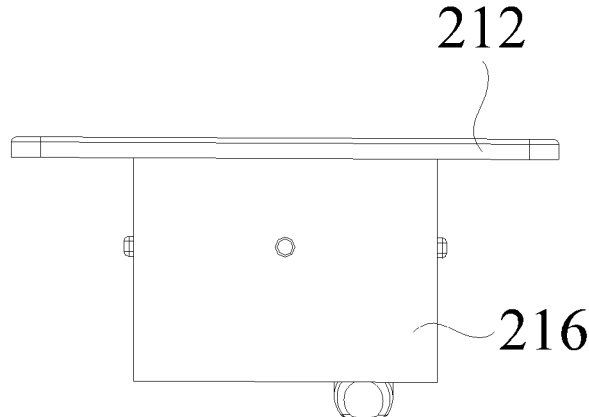
FIG. 22 shows a third schematic view of a locking assembly in a lock structure according to an embodiment of the present disclosure.
Figure 23:
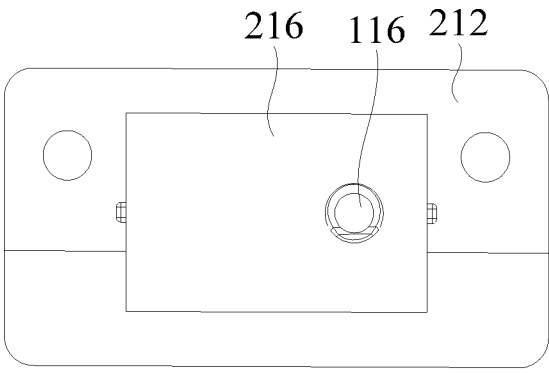
FIG. 23 is a fourth schematic view showing the structure of a locking assembly in a lock structure according to an embodiment of the present disclosure.
Figure 24:
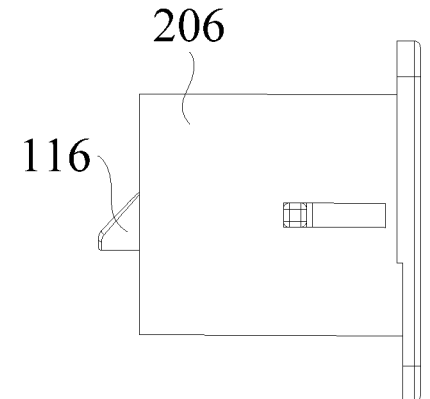
FIG. 24 shows a fifth structural view of a locking assembly in a lock structure according to an embodiment of the present disclosure.
Figure 25:
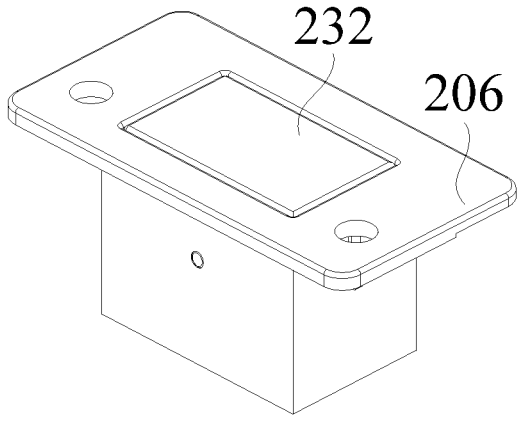
FIG. 25 shows a sixth structural view of a locking assembly in a lock structure according to an embodiment of the present disclosure.

In one possible embodiment, as shown in conjunction with FIGS. 17, 18, and 21, the second driving member 230 comprises a second elastic member, wherein the first end of the second elastic member abuts against the rotating member 218, the second end of the second elastic member is connected to the second mount 206, when the rotating member

218 is located in the first position, the second elastic member is in an original state, and when the rotating member 218 is located in the second position, the second elastic member is in an elastically deformed state.

In this embodiment, the second driving member 230 is defined as the second elastic member. The second elastic member is provided within the second mount 206 and abuts the rotating member 218 and the second mount 206. Thus, the stability of the locking member 116 is further improved by the cooperation of the third elastic member 226 and the second elastic member.

Before the user presses the rotating member 218, the second elastic member pushes the rotating member 218 to the first position when the second elastic member is in an original state and the third elastic member 226 is in a compressed state; when the user presses the same to rotate, the second elastic member is in a compressed state, and the third elastic member 226 is in an original state.

When the user stops pressing the same to rotate, the second elastic member automatically pushes the rotating member 218 to the position where the locking member 116 is pushed, ensuring that the locking member 116 is stable in the lock position.

In other embodiments, the second driving member 230 may also be an electrically driven structure, which rotates through such as a motor or cylinder driven rotating member 218.

In one possible application, both the third elastic member 226 and the second elastic member are compression springs.

In one possible embodiment, the elastic coefficient of the second elastic member is greater than the elastic coefficient of the third elastic member 226.

In this embodiment, since the elastic coefficient of the second elastic member is greater than the elastic coefficient of the third elastic member 226, the elastic force of the second elastic member is greater than the elastic force of the third elastic member 226 when the amount of deformation of the third elastic member 226 and the second elastic member is the same or similar. When the user stops pressing the rotating member 218, it is ensured that the second elastic member can overcome the elastic force of the third elastic member 226 and push the rotating member 218 to the first position.

In one possible embodiment, as shown in conjunction with FIGS. 17, 18, and 21, the second mount 206 comprises a first guide groove 208 and a second guide groove 210, wherein the first guide groove 208 and the second guide groove 210 are provided on two sidewalls opposite the second mount 206; the rotating member 218 comprises a rotating plate 220, a first sliding portion 222, and a second sliding portion 224; wherein the first sliding portion 222 is provided in the first side of the rotating plate 220, and the first sliding portion 222 can slide in the first guide groove 208; the second sliding portion 224 is provided in the second side of the rotating plate 220, and the first sliding portion 222 and the second sliding portion 224 are capable of sliding backward in the first guide groove 208 and the second guide groove 210 around the rotating center of the rotating plate 220.

In this embodiment, a first guide groove 208 and a second guide groove 210 are provided on opposite sidewalls in the second mount 206, respectively, and a first sliding portion 222 is provided on the first side of the rotating plate 220, the first sliding portion 222 extending into the first guide groove 208 and being slidable within the first guide groove 208. The second sliding portion 224 is provided on the second side of the rotating plate 220, and the second sliding portion 224 extends into and slides within the second guide groove 210. When the first side of the rotating plate 220 is pressed, the second side of the rotating plate 220 tilts up, and the locking member 116 moves to the unlocked position under an elastic force of the third elastic member 226. When the user stops pressing the rotating plate 220, the second elastic member pushes the rotating plate 220 to rotate to move back, and the rotating plate 220 pushes the locking member 116 to move to the lock position.

The first guide groove 208 guides the first sliding portion 222 and the second guide groove 210 guides the second sliding portion 224 so that the rotating plate 220 can rotate in a fixed direction to improve the stability of the rotating plate 220 when rotating.

In one possible application, the first guide groove 208 is lower than the second guide groove 210 so that excessive flipping of the rotating member 218 is avoided.

In one possible embodiment, as shown in conjunction with FIGS. 17, 18, and 21, the locking assembly 108 further comprises a pressing portion 232 which can slide within the second mount 206 and abut against the rotating member 218, the rotating member 218 being in the first position when the pressing portion 232 is in the home position and the rotating member 218 being in the second position when the pressing portion 232 is in the depressed position.

In this embodiment, the pressing portion 232 can slide into the accommodating portion, and a user can press the pressing portion 232 so that the pressing portion 232 pushes the rotating member 218, the area of the surface to be pushed of the pressing portion 232 is larger, and the contact area of the pressing portion 232 with the user's hands is larger, so that the user convenience in driving the locking member 116 can be improved. Furthermore, the pressing portion 232 can shield an opening of the mount 206, so as to prevent impurities from entering the second mount 206, and the interior of the lock structure is less likely to get stuck due to impurities, which is beneficial to improving the functional stability of the lock structure.

As shown in connection with FIGS. 17, 18, 21, and 25, in one possible embodiment, the pressing portion 232 comprises a pressing plate 234 and a pushing portion 236, wherein the pressing plate 234 is slidably connected to the second mounting 206; a pushing portion 236 is provided on the pressing plate 234, the pushing portion 236 abuts against the rotating member 218, and the pushing portion 236 and the locking member 116 are located on both sides of the rotation center of the rotating member 218.

In this design, the press plate 234 is slidingly connected to the second mount 206, ensuring that the press plate 234 can slide stably in a preset direction, so that the pushing portion 236 can push the rotating member 218 stably. The pushing portion 236 and the locking member 116 are located on both sides of the rotating center of the rotating member 218, and when the user presses the press plate 234, the pushing portion 236 abuts one side of the rotating center of the rotating member 218, when the pushing portion 236 pushes the rotating member 218. When the user stops pressing the press plate 234, the other side of the rotating center of the rotating member 218 pushes the locking member 116 to move to the lock position. By arranging the pushing portion 236 and the locking member 116 on both sides of the rotating center of the rotating member 218, the driving convenience for the rotating member 218 can be effectively improved.

In one possible embodiment, the second mount 206 can be removably connected to the mounting surface.

In this embodiment, the second mount 206 can be removably connected to the mounting surface of the cooking appliance, i.e., the second mount 206 can be removable from the cooking appliance. When the lock structure is damaged, it is possible to disassemble the lock structure from the mounting surface, so as to avoid the case where the cooking appliance cannot be switched on or off due to the lock structure damage, and improve the user convenience to the lock structure. Furthermore, when the lock structure is damaged, the lock structure can be disassembled, replaced, and maintained separately without the need to disassemble parts such as the housing of the cooking appliance, thereby reducing maintenance difficulty and saving maintenance costs.

As shown in connection with FIGS. 17, 21, 22, 23, and 24, in one possible embodiment, the second mount 206 comprises a second mounting portion 212 and a second bearing portion 216, wherein the second mounting portion 212 is provided with a fifth opening 214, the second mounting portion 212 is provided with a first side surface, and the first side surface is used for detachably connecting with the mounting surface; the first end of the second bearing portion 216 is connected to the first side surface, and the second bearing portion 216 is provided with a sixth opening and an accommodating portion in communication, wherein the sixth opening is located at the second end of the second bearing portion 216, and the locking member 116 extends into the accommodating portion via the fifth opening 214, and the locking member 116 can move relative to the sixth opening and is locked to or separated from the fixing member 106.

In this embodiment, the locking member 116 moves relative to the sixth opening and engages or disengages from the fixing member 106. When the locking member 116 extends out of the sixth opening, the locking member 116 engages the fixing member 106. When the locking member 116 extends into the sixth opening, the locking member 116 disengages from the fixing member 106. A first end of the second bearing portion 216 is connected to the second mounting part 212, and a second end of the second bearing portion 216 is provided with a sixth opening, so that a user needs to press the locking member 116 via the fifth opening 214. Furthermore, since the first side surface of the second mounting portion 212 can be connected to a mounting surface, the second mounting portion 212 is mounted on an outside surface of the cooking appliance. The second mounting portion 212 is detachably connected to the outside surface of the cooking appliance, and the second mounting portion 212 can be detached from the outside surface of the cooking appliance on the outside of the cooking appliance when the lock structure is damaged so as not to open the door body of the cooking appliance. The removal of the lock structure from the outside of the cooking appliance enables the door body of the cooking appliance to be opened by removing the lock structure even if the lock structure is damaged, thereby further improving the user convenience in using the lock structure.

In one possible embodiment, the second mounting portion 212 extends beyond the circumferential edge of the second bearing portion 216, and the second mounting portion 212 extends beyond the circumferential edge of the second bearing portion 216 is configured to abut against the mounting surface.

In this embodiment, the end of the second mounting portion 212 facing the second bearing portion 216 is a first side surface, the end of the second bearing portion 216 facing the second mounting portion 212 is a second side surface, and the area of the first side surface is larger than the area of the second side surface, so that the second mounting portion 212 may protrude beyond the circumferential edge of the second bearing portion 216. Since the first side surface of the second mounting portion 212 is used for connection with the mounting surface, the portion of the second mounting portion 212 protruding beyond the circumferential edge of the second bearing portion 216 can contact the mounting surface, and the second mounting portion 212 has a larger contact area with the mounting surface, improving the connection stability of the lock structure with the outer surface of the cooking appliance.

In connection with FIGS. 13, 14, 15, 19, and 20, in some embodiments of the present disclosure, a cooking appliance is provided. The cooking appliance comprises a cavity body assembly 102, a door body assembly 104, and the lock structure according to one or more of the embodiments described above. The door body assembly 104 is in an open-close connection with the cavity body assembly 102; among these, the fixing member 106 is provided in one of the cavity body assembly 102 and the door body assembly 104, and the locking assembly 108 is provided in the other of the cavity body assembly 102 and the door body assembly 104.

The cooking appliance provided in this example has the full benefit of the lock structure provided in any of the above examples.

The cooking appliance provided in this embodiment comprises a cavity body assembly 102, a door body assembly 104, and a lock structure in any of the designs described above. The cavity body '102 assembly comprises a cooking cavity, and the cooking cavity is used for placing the food to be cooked; the door body assembly 104 is connected to the cavity body assembly 102 and is used to open or close the cooking cavity. For example, the door body assembly 104 may be rotatably connected to the cavity body assembly 102 or slidably connected to the cavity body assembly 102. One of the cavity body assembly 102 and the door body assembly 104 is provided with a fixing member 106, and the other of the cavity body assembly 102 and the door body assembly 104 is a locking assembly 108, and the locking assembly 108 cooperates with the fixing member 106 to lock the door body assembly 104 on the cavity body assembly 102. For example, the above-mentioned locking assembly 108 is a child lock and functions as an auxiliary connection.

When the door body assembly 104 is in a closed state, the locking member 116 is in a locking station; the locking member 116 is now connected to the fixing member 106 and the user cannot open the door body assembly 104. The connection for restraining between the locking member 116 and the fixing member 106 is removed before opening the door body assembly 104; at this time, the locking member 116 is at the unlocking station, and the locking member 116 is separated from the fixing member 106.

In the process of opening the door body assembly 104, the door body assembly 104 can be directly driven to separate from the cavity body assembly 102 so as to complete a door opening operation; at this time, the locking member 116 is still in the unlocking station. In the process of closing the door body assembly 104, the work position of the locking member 116 can be switched again after the door body assembly 104 is directly closed, so that the locking member 116 is connected to the fixing member 106 for restraining.

In one possible embodiment, the cavity body assembly 102 comprises a cavity body 144 and a cover body 146 surrounding at least a portion of the cavity body 144.

In this embodiment, the cavity body assembly 102 comprises a cavity body 144 and a cover body 146. The cavity body 144 is provided with a cooking cavity, and the cooking cavity is used for placing the food to be cooked; the cover body 146 surrounds at least a portion of the cavity body 144, thereby providing good protection for the cavity body 144. In addition, there is a certain mounting cavity between the cavity body 144 and the cover body 146, so that the relevant components of the cooking appliance are mounted in the mounting cavity between the cavity body 144 and the cover body 146.

In one possible embodiment, the door body assembly 104 further comprises a door body 148, a door seal 150, and a lock catch 152, wherein the door seal 150 is connected to the door body 148, a lock catch 152 is provided on the door body 148 or the door seal 150 for open-close connection with the cavity body assembly 102.

In this embodiment, the door body assembly 104 comprises a door body 148, a door seal 150, and a lock catch 152. The door body 148 is connected with the cavity body assembly 102 and can be used to open or close the cooking cavity; the door seal 150 interfaces with the door body 148 and provides a good seal when the door body 148 closes the cooking cavity to ensure that the cooking cavity seals well during operation. In addition, the lock catch 152 provides either the door body 148 or the door seal 150 for open-close connection with the cavity body assembly 102. When the door body 148 closes the cooking cavity, the lock catch 152 connects to the cavity body assembly 102 to ensure the connection between the door body assembly 104 and the cavity body assembly 102.

For example, in the cooking appliance provided in the present disclosure, the door body assembly 104 comprises a lock catch 152, and the lock catch 152 is used for connecting with the cavity body assembly 102, thereby ensuring a stable connection between the door body assembly 104 and the cavity body assembly 102. That is, the cooking appliance provided in the present disclosure can first ensure the connection between the door body assembly 104 and the cavity body assembly 102 via the lock catch 152, and then can use the locking assembly 108 as a child lock, so that the locking assembly 108 cooperates with the fixing member 106 to further restrict the user from opening the door body assembly 104.

In one possible embodiment, a second mounting portion 212 in the second mount 206 is connected to an outer surface of the cover body 146, which is provided with a mounting hole through which a second bearing portion 216 in the second mount 206 may pass, based on the placement of the locking assembly 108 in the cavity body assembly 102.

In this embodiment, the second mounting portion 212 is detachably connected to the outer surface of the cover body 146, so that the second mounting portion 212 can be detachably connected to the outer surface of the cover body 146 at the outside of the cover body 146 when the lock structure is damaged so as not to open the door body assembly 104 of the cooking appliance. In such a manner that the locking structure is removed from the outside of the cooking appliance, even if the locking structure is damaged, the door body assembly 104 of the cooking appliance can be opened by removing the locking structure, thereby improving the user convenience in using the cooking appliance. In such a manner that the locking structure is removed from the outside of the cooking appliance, even if the lock structure is damaged, can open the door body assembly 104 of the cooking appliance by disassembling the lock structure to improve the user convenience to the cooking appliance.

In one possible application, the locking assembly 108 is provided on the top wall of the cover body 146 such that the user operates on the locking assembly 108.

In one possible application, the second mounting portion 212 is provided with a through-hole and the cover body 146 is provided with a threaded hole, and the second mounting portion 212 is secured to the cover body 146 by passing a bolt through the through-hole in the second mounting portion 212 and locking the bolt to the threaded hole.

In some possible embodiments, the fixing member 106 is connected to the door body 148 based on the fixing member 106 being provided on the door body assembly 104.

In this embodiment, the fixing member 106 may be provided at the door body assembly 104. The fixing member 106 is provided in the door body assembly 104, it may be that the fixing member 106 is connected to the door body 148. At this time, the locking assembly 108 is provided in the cavity body assembly 102, thereby ensuring that the locking assembly 108 corresponds to the position of the fixing member 106. For example, a fastener such as a bolt can be used for connection between the fixing member 106 and the door body 148, or a snap fit may be used.

In addition, the door body 148 itself has a good strength and hardness, and connecting the fixing member 106 with the door body 148 can further ensure the secure connection of the fixing member 106, and improve the mating stability of the locking assembly 108 and the fixing member 106, so as to extend the service life of the fixing member 106 and the whole cooking appliance.

In some possible embodiments, the fixing member 106 is connected to the door seal 150 based on the fixing member 106 being provided on the door body assembly 104.

In this embodiment, the fixing member 106 may be provided at the door body assembly 104. Where the fixing member 106 is provided in the door body assembly 104, it may be that the fixing member 106 is connected to the door seal 150. At this time, the locking assembly 108 is provided in the cavity body assembly 102, thereby ensuring that the locking assembly 108 corresponds to the position of the fixing member 106. For example, a fastener such as a bolt can be used for connection between the fixing member 106 and the door seal 150, or a snap fit may be used.

Additionally, during the use of the cooking appliance, the door seal 150 is in direct contact with the cavity body assembly 102 and is closer to the cavity body assembly 102 than the door body 148. Thus, mounting the fixing member 106 in the door seal 150 reduces the size requirements for the fixing member 106 and simplifies the construction of the fixing member 106 as well as the entire cooking appliance.

In some possible embodiments, the fixing member 106 and the door body 148 are of an integrated structure based on the providing of the fixing member 106 to the door body assembly 104.

In this embodiment, the fixing member 106 may be provided at the door body assembly 104. When the fixing member 106 is provided in the door body assembly 104, the fixing member 106 and the door body 148 can be an integrated structure. The fixing member 106 and the door body 148 are of an integrated structure, which on the one hand can reduce the use of connectors between the fixing member 106 and the door body 148, and on the other hand can greatly improve the connection strength between the fixing member 106 and the door body 148, thereby ensuring the connection stability of the fixing member 106 and the locking member 116, so as to prolong the service life of the fixing member 106 and the whole cooking appliance.

In some possible embodiments, the fixing member 106 and the door seal 150 are of an integrated structure based on the fixing member 106 being placed in the door body assembly 104.

In this embodiment, the fixing member 106 may be provided at the door body assembly 104. When the fixing member 106 is provided in the door body assembly 104, the fixing member 106 and the door seal 150 are of an integrated structure. The fixing member 106 and the door seal 150 are of an integrated structure, which on the one hand can reduce the use of connectors between the fixing member 106 and the door seal 150, and on the other hand can greatly improve the connection strength between the fixing member 106 and the door seal 150, thereby ensuring the connection stability of the fixing member 106 and the locking member 116, so as to prolong the service life of the fixing member 106 and the whole cooking appliance.

In one possible embodiment, the fixing member 106 is connected to the cavity body 144 based on the fixing member 106 being provided on the cavity body assembly 102.

In this embodiment, the fixing member 106 may be provided at the cavity body assembly 102. The fixing member 106 is provided in the cavity body assembly 102, it may be that the fixing member 106 is connected to the cavity body 144. At this time, the locking assembly 108 is provided in the door body assembly 104, thereby ensuring that the locking assembly 108 corresponds to the position of the fixing member 106. For example, a fastener such as a bolt can be used for connection between the fixing member 106 and the cavity body 144, or a snap fit may be used.

In addition, the cavity body assembly 102 itself has good strength and hardness, and connecting the fixing member 106 with the cavity body 144 can further ensure the secure connection of the fixing member 106, and improve the mating stability of the locking assembly 108 and the fixing member 106, so as to extend the service life of the fixing member 106 and the whole cooking appliance.

In one possible embodiment, the fixing member 106 is connected to the cover body 146 based on the fixing member 106 being provided on the cavity body assembly 102.

In this embodiment, the fixing member 106 may be provided at the cavity body assembly 102. The fixing member 106 is provided in the cavity body assembly 102, it may be that the fixing member 106 is connected to the cover body 146. The locking assembly 108 is now provided in the door body assembly 104, thereby ensuring that the locking assembly 108 corresponds to the location of the fixing member 106. For example, a fastener such as a bolt can be used for connection between the fixing member 106 and the cover body 146, or a snap fit may be used.

In addition, the structure of the cover body 146 is relatively simple, and the connection of the fixing member 106 with the cover body 146 can reduce the mounting difficulty of the fixing member 106, thus improving the assembly efficiency of the locking assembly 108 and the cooking appliance. Furthermore, the connection between the fixing member 106 and the cover body 146 can reduce the structural and manufacturing requirements of the cavity body 144 and further improve the manufacturing efficiency of the cavity body 144.

In one possible embodiment, a second mounting portion 212 in the second mount 206 is connected to an outer surface of the door body 148, which is provided with a mounting hole through which a second bearing portion 216 in the second mount 206 may pass, based on the placement of the locking assembly 108 in the door body assembly 104.

In this embodiment, the second mounting portion 212 is detachably connected to the outer surface of the door body 148, so that the second mounting portion 212 can be detachably connected to the outer surface of the door body 148 at the outside of the door body 148 when the locking structure is damaged so as not to open the door body assembly 104 of the cooking appliance. In such a manner that the locking structure is removed from the outside of the cooking appliance, even if the lock structure is damaged, can open the door body assembly 104 of the cooking appliance by disassembling the lock structure to improve the user convenience to the cooking appliance.

In one possible application, the second mounting portion 212 is provided with a through-hole and the door body 148 is provided with a threaded hole, and the second mounting portion 212 is secured to the door body 148 by passing a bolt through the through-hole in the second mounting portion 212 and locking the bolt to the threaded hole.

In one possible application, the locking assembly 108 is provided on the top wall of the door body 148 such that the user operates on the locking assembly 108.

In one possible embodiment, the cooking appliance comprises a wave oven, an oven, a steaming box, or a steaming and roasting integrated machine.

In the present disclosure, the term "plurality" means two or more unless explicitly defined otherwise. The terms "mounted", "connected", "fixed" and the like are used broadly and should be construed to include, for example, "connected" may be a fixed connection, a detachable connection, or an integral connection; "connected" may be directly connected or indirectly connected through an intermediate. The specific meaning of the above terms in the present disclosure can be understood by a person skilled in the art as the case may be.

In the description of the present disclosure, the description of the terms "one embodiment", "some embodiments", "a specific embodiment", etc., mean that a particular feature, structure, material, or characteristic described in connection with the embodiment or example is included in at least one embodiment or example of the present disclosure. In this description, the schematic representations of the terms used above do not necessarily refer to the same embodiment or example. Furthermore, the particular features, structures, materials, or characteristics described may be combined in any suitable manner in any embodiment or example.

The above description is only directed to exemplary embodiments of the present disclosure and is not intended to restrain the present disclosure, and various modifications and changes may be made to the present disclosure by those skilled in the art. Any modification, equivalent replacement, or improvement made within the spirit and principle of the present disclosure shall be included in the protection scope of the present disclosure.

What is claimed is:

1. A lock structure comprising:
   a fixing member; and
   a locking assembly comprising:
     a bearing member comprising:
       a mounting portion provided with a first opening, wherein the mounting portion comprises a first side surface configured to detachably connect with a mounting surface; and
       a bearing portion comprising:
         a first end connected to the first side surface of the mounting portion, and a second end, wherein the second end is provided with a second opening; and
         an accommodation portion in communication with the second opening;

a mount connected to the bearing member, wherein the mount extends into the accommodation portion of the bearing member via the first opening of the bearing member;

a driving member disposed at least partially within the mount;

a first elastic member comprising:

a first end connected to the driving member; and a second end; and a locking member connected to the second end of the first elastic member, wherein the locking member is configured to move relative to the second opening of the bearing member under a driving of the driving member and the first elastic member to be locked to or separated from the fixing member.

2. The lock structure according to claim 1, wherein:

the mounting portion extends out of a circumferential edge of the bearing portion, and the mounting portion extending out of the circumferential edge of the bearing portion is configured to abut against the mounting surface.

3. The lock structure according to claim 1, wherein the mount is detachably connected to the bearing portion.

4. The lock structure according to claim 1, wherein the bearing member further comprises a baffle connected to the bearing portion, wherein the baffle is capable of sliding within the accommodating portion to push the locking member.

5. The lock structure according to claim 1, wherein the locking assembly further comprises a guide structure provided on the mount, wherein at least a portion of the driving member is movable along with the guide structure and restrained at an end of the guide structure.

6. The lock structure according to claim 5, wherein the driving member comprises:

a pressing member penetrating the mount and movably connected to the mount, wherein the pressing member comprises a first inclined surface; and a moving member slidingly connected to the guide structure, the moving member being connected to a first end of the first elastic member, the moving member being capable of being restrained to an end portion of the guide structure, wherein the moving member comprises a second inclined surface, and the first inclined surface is configured to abut against the second inclined surface, so as to drive the moving member to drive the locking member to switch a locking station of the locking member.

7. The lock structure according to claim 6, wherein:

the moving member comprises a sliding jaw sleeve, a sidewall of the sliding jaw sleeve is provided with a first protruding portion, wherein the first protruding portion is slidably connected to the guide structure and is configured to abut against the end portion of the guide structure, and the second inclined surface is provided on the first protruding portion.

8. The lock structure according to claim 1, wherein the locking assembly further comprises a driving inclined surface abutting against the fixing member to drive the locking member to move relative to the mount.

9. The lock structure according to claim 1, wherein the locking assembly further comprises a second elastic member provided in the mount and connected to the driving member and the mount for moving the locking member back, wherein at least a part of the first elastic member is located inside the locking member, and the second elastic member is sleeved on the locking member.

10. A cooking appliance comprising:

a cavity body assembly comprising:

a cavity body; and a cover body surrounding at least a portion of the cavity body and comprising an outside surface forming a mounting hole;

a door body assembly in an open-close connection with the cavity body assembly; and a lock structure comprising:

a fixing member disposed in the door body assembly; and a locking assembly comprising:

a bearing member comprising:

a mounting portion detachably connected with the outside surface the cavity body assembly; and a bearing portion passing through the mounting hole of the cavity body assembly;

a mount connected to the bearing member;

a driving member disposed at least partially within the mount;

a first elastic member comprising:

a first end connected to the driving member; and a second end; and a locking member connected to the second end of the first elastic member, and configured to move relative to the second opening of the bearing member under a driving of the driving member and the first elastic member to be locked to or separated from the fixing member.

11. The cooking appliance according to claim 10, wherein the fixing member is connected to the door body or connected to the door seal based on the fixing member being provided to the door body assembly.

12. The cooking appliance according to claim 10, wherein the fixing member comprises a one-piece structure with the door body or a one-piece structure with the door seal based on the fixing member being provided on the door body assembly.

13. A cooking appliance comprising:

a cavity body assembly;

a door body assembly comprising:

a door body comprising an outside surface forming a mounting hole;

a door seal connected to the door body; and a lock catch provided on the door body or the door seal configured to provide an open-close connection with the cavity body assembly; and a lock structure comprising:

a fixing member disposed in the cavity body assembly; and a locking assembly comprising:

a bearing member comprising:

a mounting portion detachably connected with the outside surface the door body assembly; and a bearing portion passing through the mounting hole of the door body assembly;

a mount connected to the bearing member;

a driving member disposed at least partially within the mount;

a first elastic member comprising:

a first end connected to the driving member; and a second end; and a locking member connected to the second end of the first elastic member, and configured to move relative to the second opening of the bearing member under a driving of the driving member and the first elastic member to be locked to, or separated from, the fixing member.

14. The cooking appliance according to claim 13, wherein the fixing member is connected to a cover body of the cavity body based on the fixing member being provided in the cavity body assembly.

15. The cooking appliance according to claim 10, wherein the cooking appliance comprises a wave oven, an oven, a steaming box, or a steaming and roasting integrated machine.

16. The cooking appliance according to claim 13, wherein the fixing member is connected to the cavity body based on the fixing member being provided in the cavity body assembly.

17. The cooking appliance according to claim 13, wherein the cooking appliance comprises a wave over, an oven, a steaming box, or a steaming and roasting integrated machine.

\* \* \* \* \*